(12) United States Patent
Hasama

(10) Patent No.: US 9,197,769 B2
(45) Date of Patent: Nov. 24, 2015

(54) INFORMATION PROCESSING APPARATUS, CONTROL METHOD, AND STORAGE MEDIUM INCLUDING DEVICE MANAGEMENT APPLICATION FOR MANAGING PERIPHERAL DEVICES

(71) Applicant: CANON KABUSHIKI KAISHA, Tokyo (JP)

(72) Inventor: Yuichi Hasama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/863,845

(22) Filed: Apr. 16, 2013

(65) Prior Publication Data

US 2013/0278954 A1 Oct. 24, 2013

(30) Foreign Application Priority Data

Apr. 18, 2012 (JP) ................ 2012-094818

(51) Int. Cl.
*H04N 1/00* (2006.01)
*G06F 3/12* (2006.01)
*G06F 3/048* (2013.01)

(52) U.S. Cl.
CPC ............ *H04N 1/00413* (2013.01); *G06F 3/048* (2013.01); *G06F 3/1204* (2013.01); *G06F 3/1225* (2013.01); *G06F 3/1257* (2013.01); *H04N 1/00233* (2013.01); *H04N 2201/0094* (2013.01)

(58) Field of Classification Search
CPC .......... H04N 1/00233; H04N 1/00408; H04N 1/00413; H04N 2201/0094; G06F 3/048; G06F 3/1204; G06F 3/1225; G06F 3/1257
USPC ........................................ 358/1.1, 1.13, 1.15
See application file for complete search history.

(56) References Cited

U.S. PATENT DOCUMENTS

| | | | |
|---|---|---|---|
| 6,857,105 B1 * | 2/2005 | Fox et al. ...................... | 715/825 |
| 8,405,841 B2 * | 3/2013 | Minamizono ................ | 358/1.13 |
| 2008/0062461 A1 * | 3/2008 | Shiono et al. ................ | 358/1.15 |
| 2010/0067034 A1 | 3/2010 | Minamizono | |
| 2011/0102836 A1 * | 5/2011 | Kawaura et al. ............. | 358/1.15 |

FOREIGN PATENT DOCUMENTS

| | | |
|---|---|---|
| CN | 101526771 A | 9/2009 |
| JP | 2010-123103 A | 6/2010 |

* cited by examiner

*Primary Examiner* — Thomas D Lee

(74) *Attorney, Agent, or Firm* — Canon USA, Inc. IP Division

(57) ABSTRACT

When an information processing apparatus displays an icon of a group of a plurality of peripheral devices, the apparatus displays on a home screen an icon of a peripheral device intended by a user, separately from the one icon of the group of the peripheral devices. Further, on the home screen, an icon of a device selected by the user on a screen of a device management application managing the peripheral devices is displayed.

11 Claims, 20 Drawing Sheets

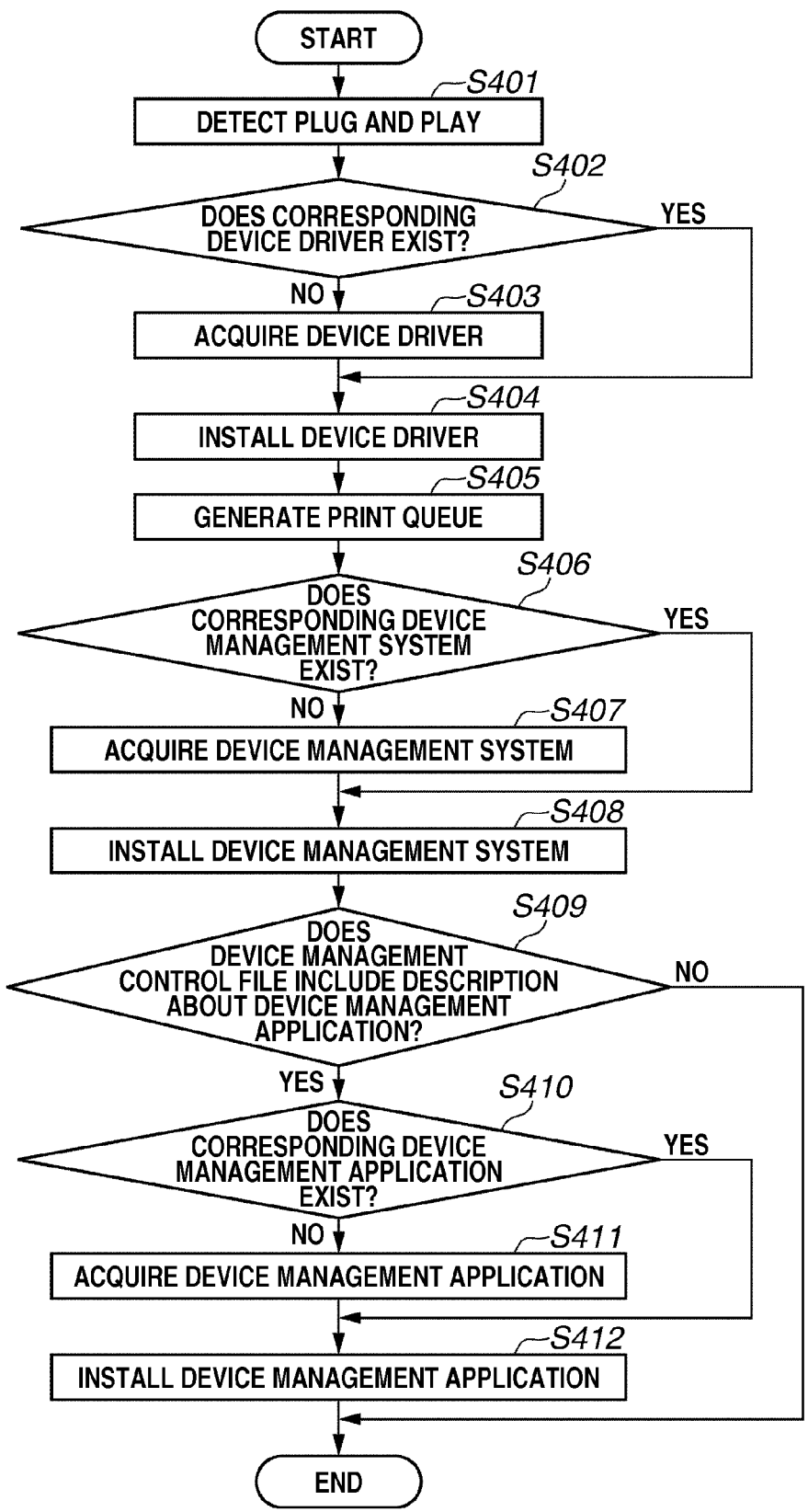

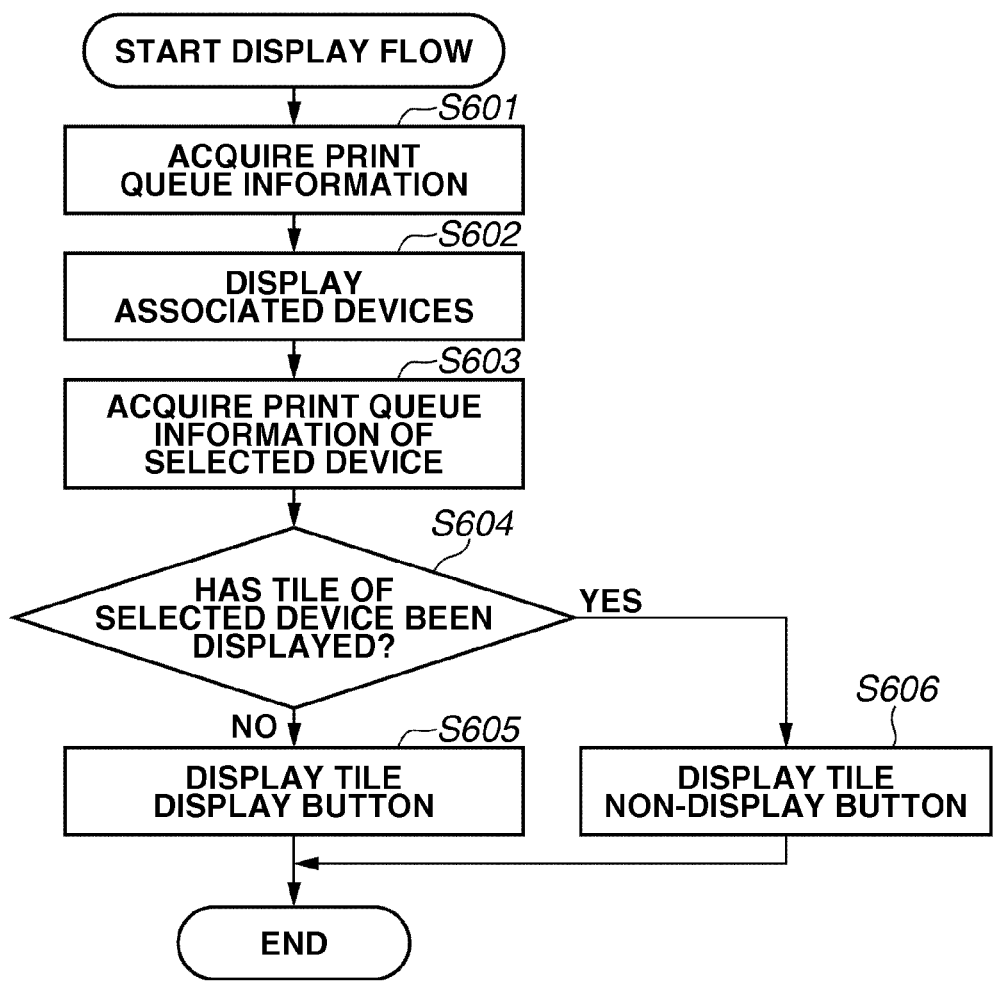

FIG.9A

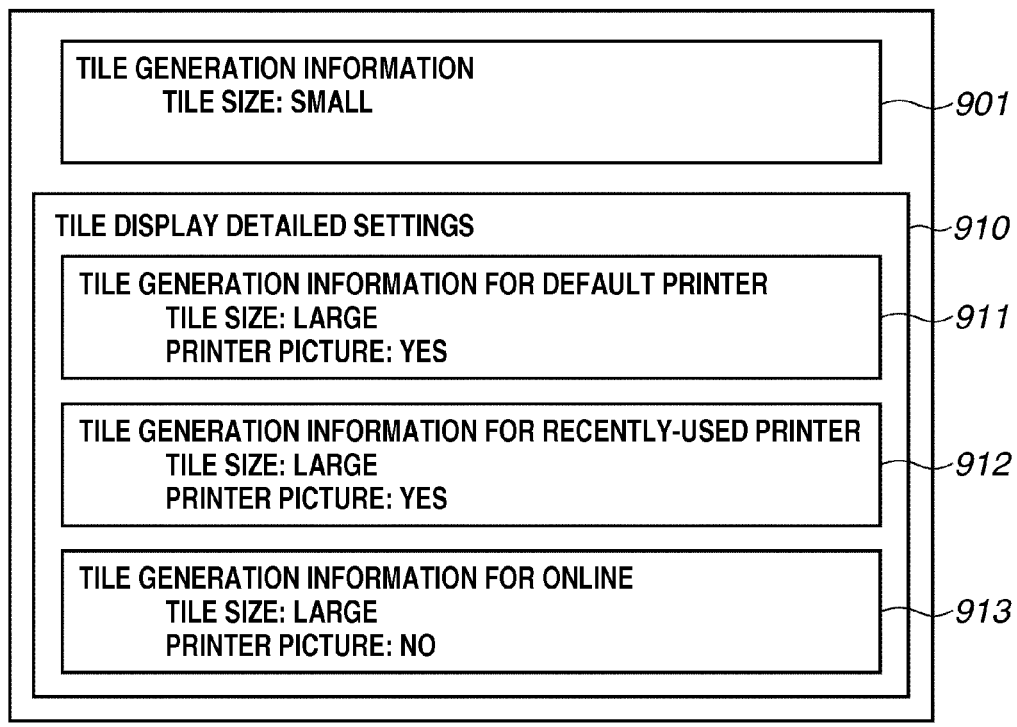

- TILE GENERATION INFORMATION
  TILE SIZE: SMALL — 901
- TILE DISPLAY DETAILED SETTINGS — 910
  - TILE GENERATION INFORMATION FOR DEFAULT PRINTER
    TILE SIZE: LARGE
    PRINTER PICTURE: YES — 911
  - TILE GENERATION INFORMATION FOR RECENTLY-USED PRINTER
    TILE SIZE: LARGE
    PRINTER PICTURE: YES — 912
  - TILE GENERATION INFORMATION FOR ONLINE
    TILE SIZE: LARGE
    PRINTER PICTURE: NO — 913

FIG.9B

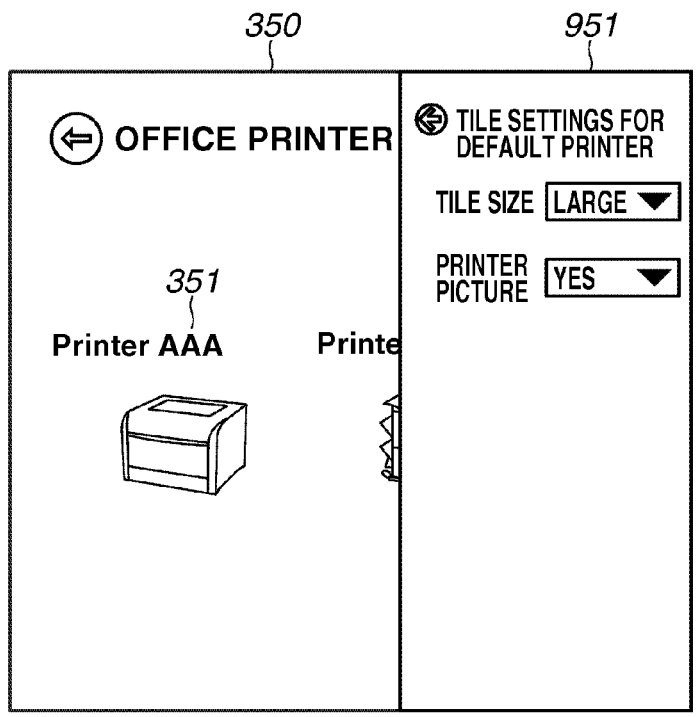

350, 951

← OFFICE PRINTER

← TILE SETTINGS FOR DEFAULT PRINTER

TILE SIZE [LARGE ▼]

PRINTER PICTURE [YES ▼]

351

Printer AAA    Printe

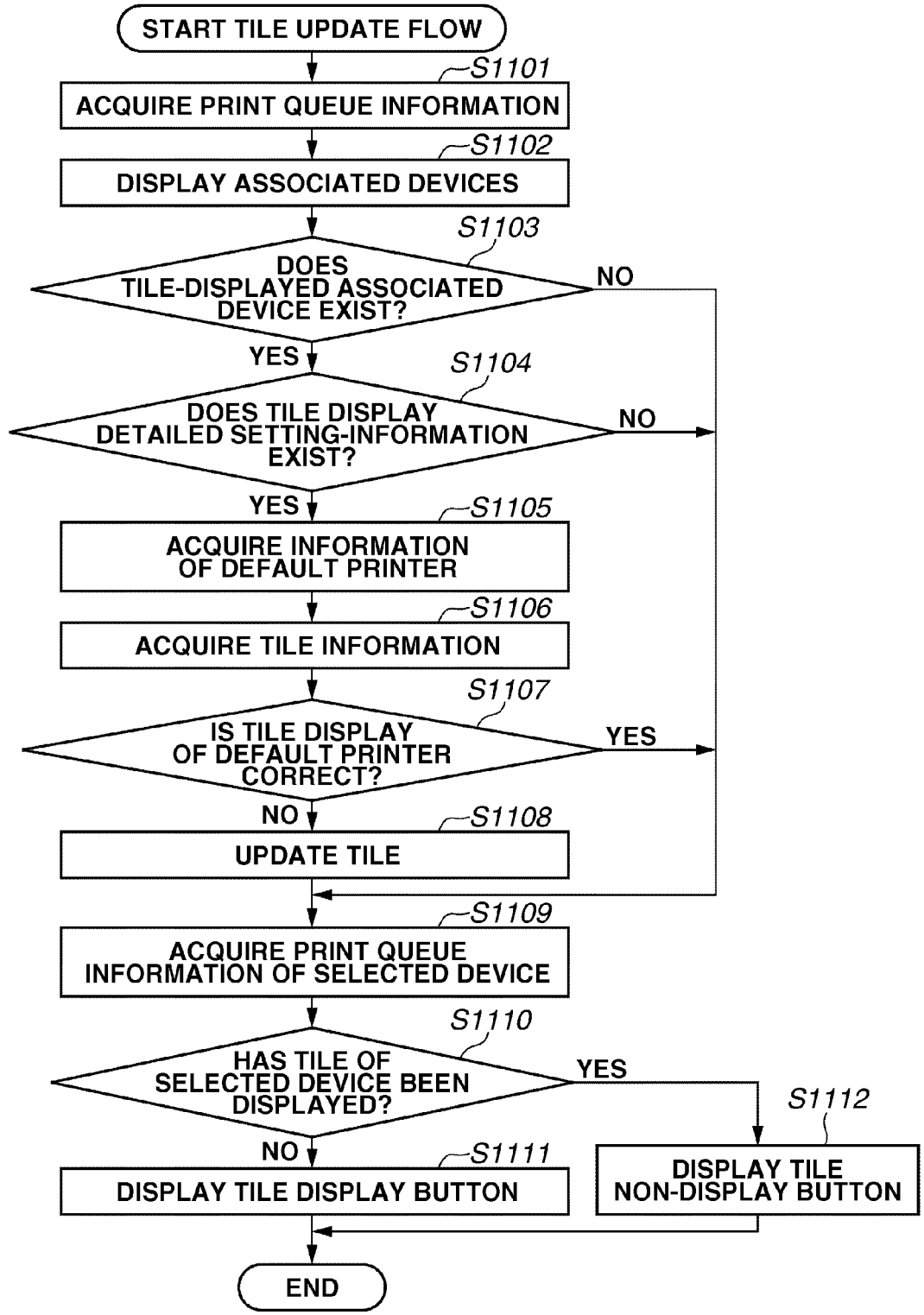

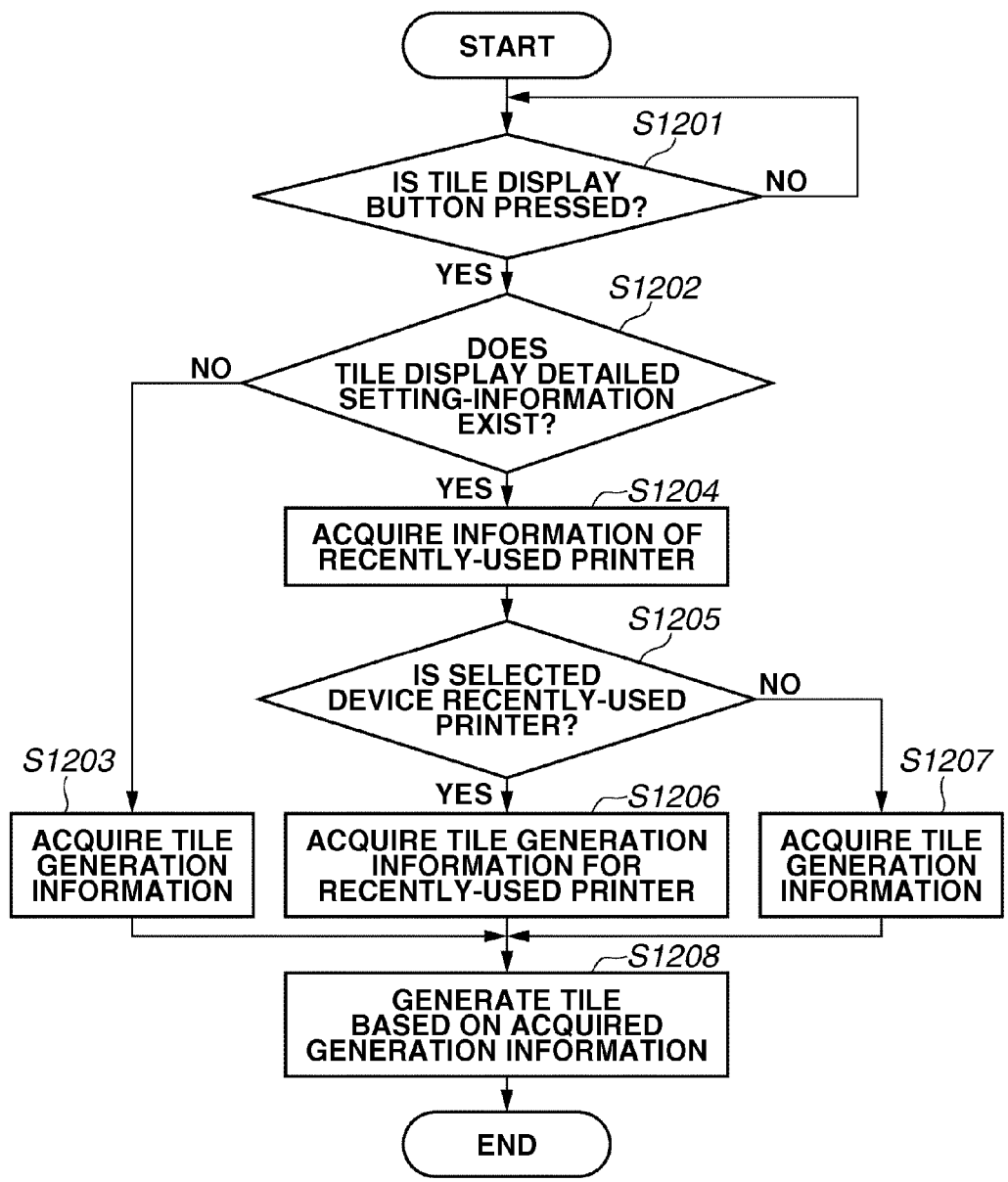

INFORMATION PROCESSING APPARATUS, CONTROL METHOD, AND STORAGE MEDIUM INCLUDING DEVICE MANAGEMENT APPLICATION FOR MANAGING PERIPHERAL DEVICES

BACKGROUND OF THE INVENTION

1. Field of the Invention

The present invention relates to an information processing apparatus, a control method, and a storage medium.

2. Description of the Related Art

Japanese Patent Application Laid-Open No. 2010-123103 discusses a technique for displaying an icon corresponding to a printer driver by installing the printer driver.

In the technique, however, each installation of a printer driver, an icon corresponding to the printer driver is displayed. As a result, for a user, it is difficult to find an icon that the user wants to use, and this may decrease the operability of the user.

SUMMARY OF THE INVENTION

The present invention is directed to an information processing apparatus.

According to an aspect of the present invention, an information processing apparatus capable of displaying a first object on a display screen, the first object being configured to receive an operation command of a management application installed in response to installation of a device driver of a peripheral device is provided. The information processing apparatus includes a selection unit configured to receive a selection of one device object from a plurality of device objects of peripheral devices associated with the management application, and a display control unit configured to display a second object corresponding to the received one device object on the display screen. The first object is different from the second object, and the peripheral devices associated with the management application have different addresses respectively.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

FIG. 4 is a flowchart illustrating an installation procedure of the device management application.

FIG. 6 is a flowchart illustrating tile display processing in the device management application.

FIGS. 9A and 9B illustrate tile display detailed settings.

FIG. 11 is a flowchart illustrating tile update processing in the device management application.

FIG. 12 is a flowchart illustrating an operation processed in the device management application with a recently-used printer.

DESCRIPTION OF THE EMBODIMENTS

Various exemplary embodiments, features, and aspects of the invention will be described in detail below with reference to the drawings.

Figure 1A:
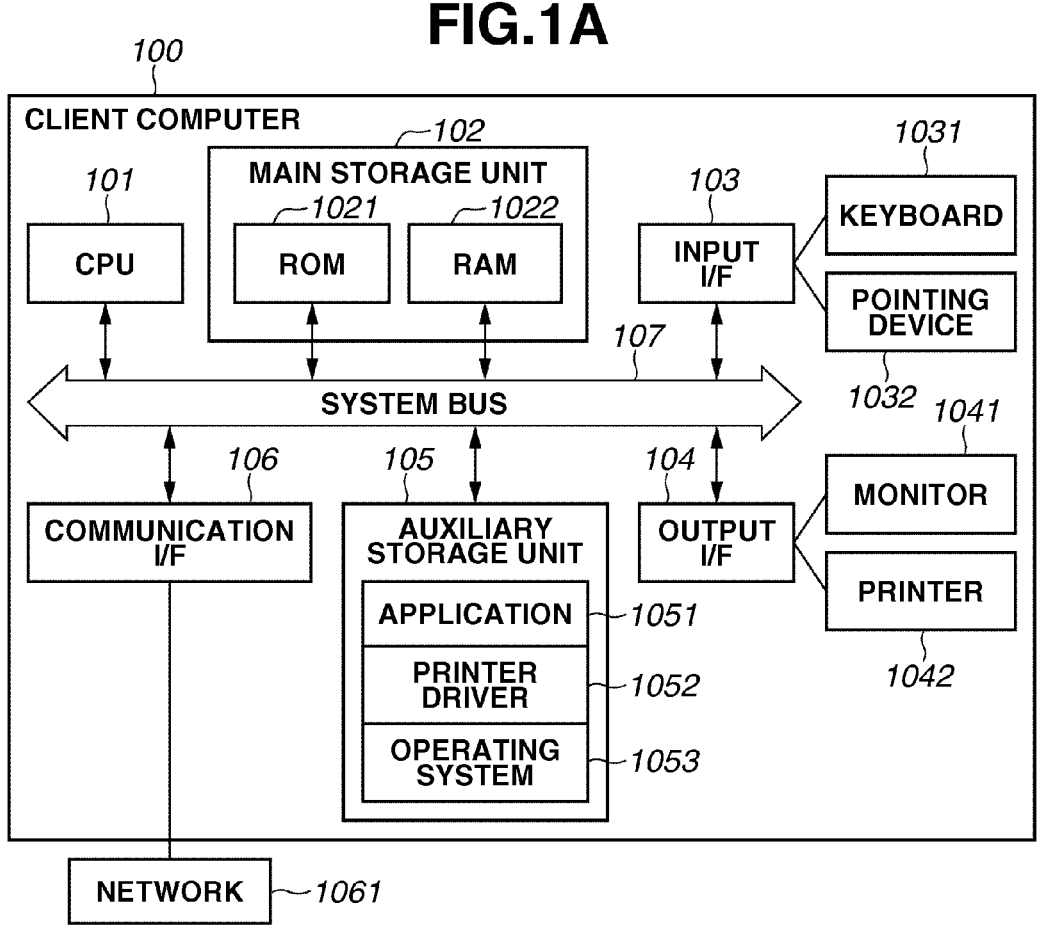
FIGS. 1A and 1B are block diagrams illustrating hardware and software of a computer system.
Figure 1B:
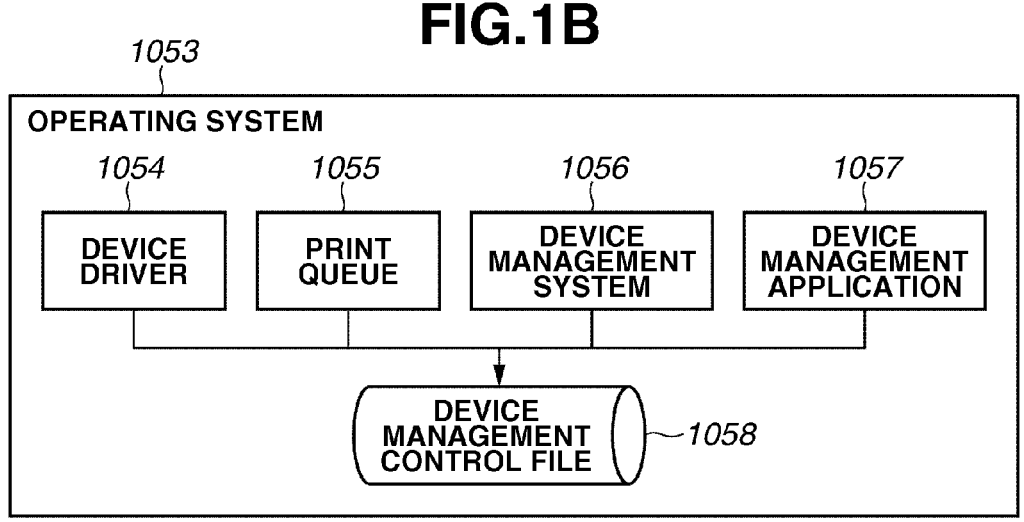

FIGS. 1A and 1B are block diagrams of a system using a general computer according to an exemplary embodiment of the present invention. As long as not specifically mentioned, the exemplary embodiment of the present invention can be applied to any single function, any system including a plurality of devices, or any system performing processing via connection with a network.

A client computer (information processing apparatus) 100 has a system configuration illustrated in FIG. 1A. The system will be described in detail below.

A central processing unit (CPU) 101 performs overall control of the apparatus according to a program stored in a read-only memory (ROM) 1021 or a random access memory (RAM) 1022 in a main storage unit 102 or an auxiliary storage unit 105. The RAM 1022 is also used as a work area for the CPU 101 in performing various kinds of processing. The auxiliary storage unit 105 stores an operating system (OS) 1053, application software 1051, and the like. In the description below, a storage unit consisting of the main storage unit 102 and the auxiliary storage unit 105 is referred to as a storage unit.

Input devices such as a pointing device 1032 represented by a mouse, a touch panel, and the like, and a keyboard 1031 are connected via an input interface (I/F) 103. Such devices are used when a user gives various instructions to a computer.

An output I/F 104 is used to output data to the outside. The output I/F 104 outputs data to an output device such as a monitor 1041 and a printer 1042 (also referred to as multi-function peripheral (MFP) or peripheral device). The connection between the apparatus and the printer 1042 is not limited to the direct connection with the output I/F. In other words, the apparatus can be connected to the printer via a network 1061 that is connected via a communication I/F 106.

A common system bus 107 is used to send or receive data among the I/Fs and modules.

With the above-described configuration, the CPU 101 executes processing according to a program stored in the storage unit, and thereby the software configuration of the client computer 100 illustrated in FIG. 1B and the processing in each step in flowcharts described below can be implemented.

A device driver 1054 and a print queue 1055 store a device ID corresponding to a printer to be connected. A device management control file 1058 includes descriptions of the association of the device ID with a device management system 1056 and a device management application 1057 (see Table A and FIG. 5 described below for more details). The device management application 1057 is used to manage printers connected to the client computer 100.

An operating system (OS) 1053 refers to the device management control file. The reference enables the OS to determine the relationship of the association of the device driver 1054, the print queue 1055, the device management system 1056, and the device management application 1057 via the device ID. The device management application 1057 can be referred to as the device management app 1057.

The device management control file 1058 can create a file for each model, or create one file for all models.

Figure 2:
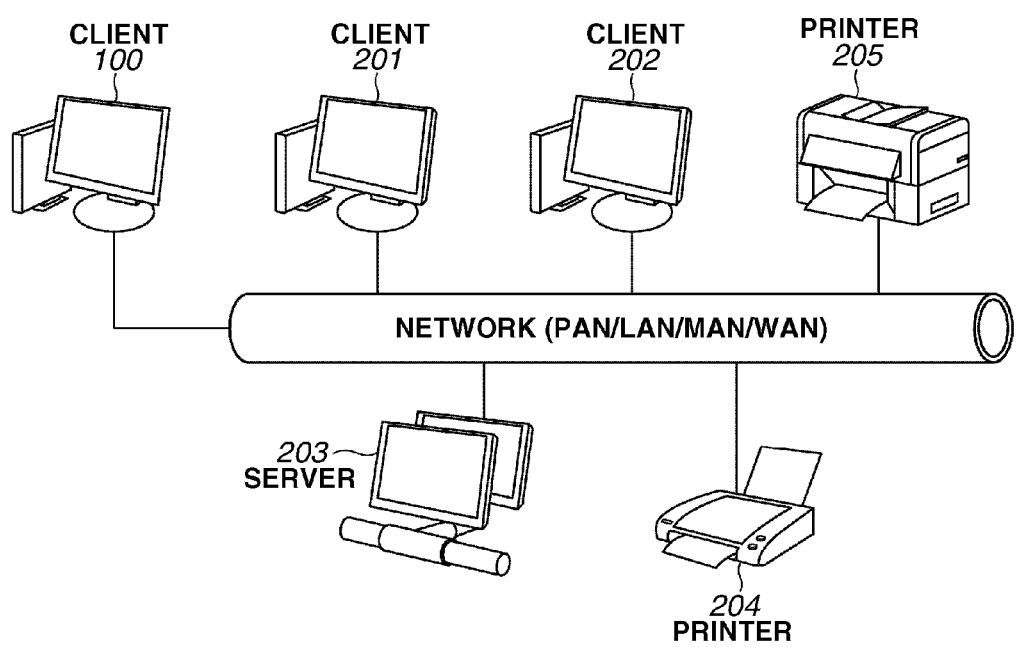
FIG. 2 illustrate a configuration of a network connected to clients, a server, and printers.

FIG. 2 illustrates a simplified environment of the network 1061 according to the exemplary embodiment of the present invention.

A single or a plurality of client computers 100, 201, and 202 for creating documents or images to be printed are connected to the network. A server computer 203 that manages users of the clients and the printers can be connected to the network.

A single or a plurality of printers 204 and 205 are connected to the network. The printers can be in a off-line state, for example, the printer 205 is physically connected to the network, however, the user cannot actually use the printer.

The size of the network can range from a small network to a large network such as a personal area network (PAN), a local area network (LAN), a metropolitan area network (MAN), and a wide area network (WAN), and the devices are connected to all networks. The servers and the printers can be connected over the Internet, for example, cloud computing. In FIG. 2, printers 204 and 205 are illustrated, and the printers can be referred to as MFPs or peripheral devices as described above.

Figure 3A:
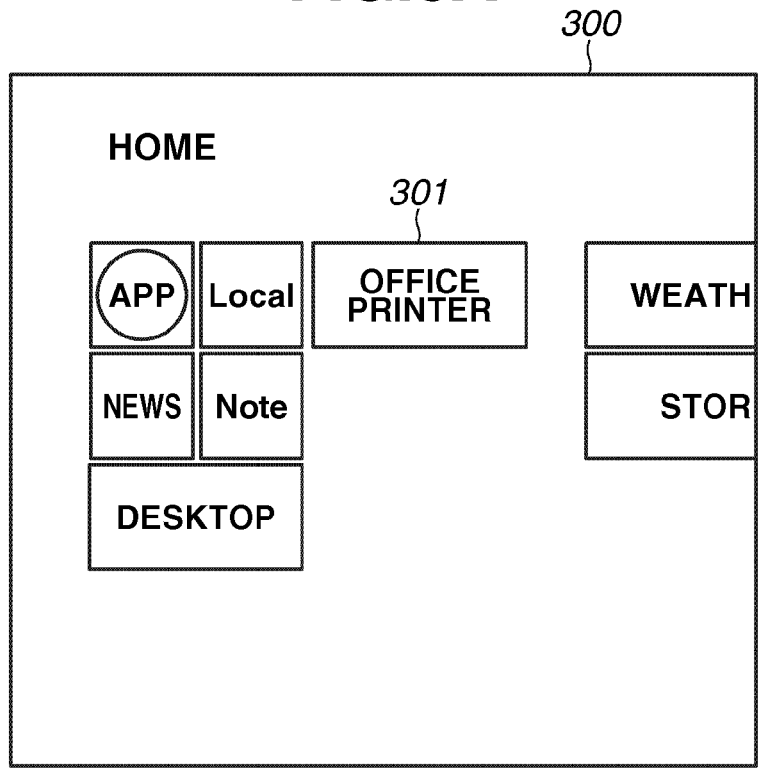
FIGS. 3A and 3B illustrate examples of a display on a screen of a device management application.
Figure 3B:
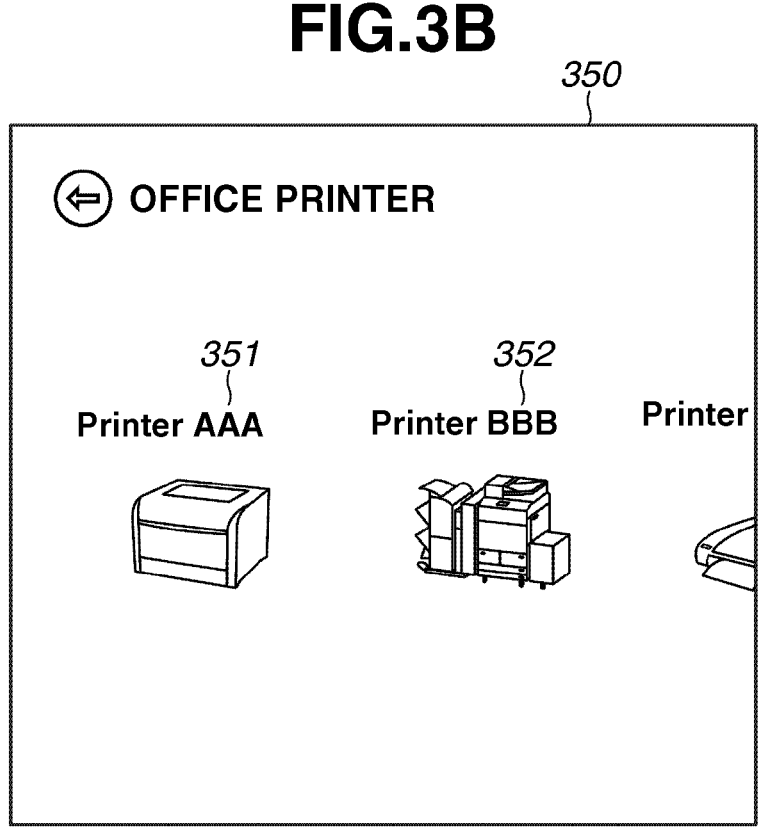

FIGS. 3A and 3B illustrate examples of a display of the device management application.

As illustrated in FIG. 3A, the OS 1053 arranges and displays tiles for implementing individual functions. The OS 1053 also displays a tile 301 of the device management application 1057. In other words, when the user selects the tile 301, the device management application 1057 operates. The tile can be simply referred to as an object. That is, the information processing apparatus according to the exemplary embodiment can display the above-described tiles.

Further, the OS according to the exemplary embodiment displays only one application while a plurality of applications are active, and provides an environment in which only the UI of the application is displayed. Therefore, UIs of the other active applications are not displayed.

If the application to be displayed is changed, the UI of the changed application is displayed. In this specification, for convenience, a screen 300 in FIG. 3A is referred to as a home screen. The home screen 300 is provided by the OS 1053 to display information provided from various applications installed in the OS 1053, and to start the application in response to an operation command with a click operation (touch operation) by the user. In other words, the tile is displayed to receive an operation command.

As illustrated in FIG. 3B, when the user clicks the tile 301, a screen 350 including device objects of a plurality of peripheral devices managed by the device management application 1057 (devices associated with the device management application 1057) is displayed. On the screen 350 of the device management application 1057, device objects 351 and 352 indicating the peripheral devices associated with the device management application are displayed.

As described below, with the device management application, a plurality of peripheral devices having different address information are associated. The user selects one device object, and a screen including the current status of the peripheral devices associated with the device object, and information about consumables is displayed. The device object is associated with a print queue managed by the OS.

In the exemplary embodiment, it is assumed that the device object is displayed. Alternatively, a print queue can be displayed on the screen of the device management application 1057.

FIG. 4 is a flowchart illustrating an installation procedure of the device management application 1057 to be performed when a print queue 1055 is generated.

In step S401, the OS 1053 detects a connection of a printer to the output I/F 104. The detection is implemented by a Plug and Play (PnP) function included as standard in the OS 1053. This is similar in a connection of a printer via the network 1061 that is connected via the communication I/F 106. The PnP in this network connection is implemented by a Network Plug and Play (N-PnP) function.

In step S402, the OS 1053 searches the storage unit in the client computer 100 for the device driver 1054 corresponding to the printer detected in step S401. As a result of the search in step S402, if the corresponding device driver 1054 does not exist (NO in step S402), in step S403, the OS 1053 acquires the device driver 1054. The device driver 1054 can be acquired from a storage medium such as a compact disk read-only memory (CD-ROM) inserted into the client computer 100, a storage device of a server computer connected via a LAN, a cloud server via the Internet, or the like. As a result of the search, if the corresponding device driver 1054 exists (YES in step S402), the process proceeds to step S404.

In step S404, the OS 1053 installs the device driver 1054 acquired in step S403 in the client computer 100.

In step S405, the OS 1053 generates the print queue 1055 corresponding to the connected printer.

In step S406, the OS 1053 searches the storage unit in the client computer 100 for the device management system 1056 corresponding to the printer connected to the client computer 100. As a result of the search, if the corresponding device management system 1056 exists (YES in step S406), the process proceeds to step S408. As a result of the search, if the corresponding device management system 1056 does not exist (NO in step S406), in step S407, the OS 1053 acquires the corresponding device management system 1056.

The device management system 1056 can be acquired from a storage medium such as a CD-ROM inserted into the client computer 100, a storage device of a server computer connected via a LAN, a cloud server via the Internet, or the like. In the acquisition of the device management system 1056, the device management control file 1058 is simultaneously acquired. The device management control file 1058 describes a relationship among the connected printer, the device management system, and the device management application, and the file stores the information shown in Table A described below.

In step S408, the OS 1053 installs the device management system 1056. In step S409, the OS 1053 searches the device management control file 1058 for a description about a device management application. As a result of the search, if the description about the device management application does not exist (NO in step S409), the processing ends.

Meanwhile, in step S409, if the description about the device management application exists (YES in step S409), the process proceeds to step S410. In step S410, the OS 1053 searches the storage unit in the client computer 100 for the device management application 1057 corresponding to the printer connected to the client computer 100.

As a result of the search, if the corresponding device management application 1057 does not exist (NO in step S410), in step S411, the OS 1053 acquires the corresponding device management application 1057. The device management application 1057 can be acquired from a storage medium such as a CD-ROM inserted into the client computer 100, a storage device of a server computer connected via a LAN, a cloud server via the Internet, or the like.

In step S412, the OS 1053 installs the device management application 1057. As illustrated in FIG. 3A, the installed device management application 1057 is displayed as the tile 301.

Figure 5:
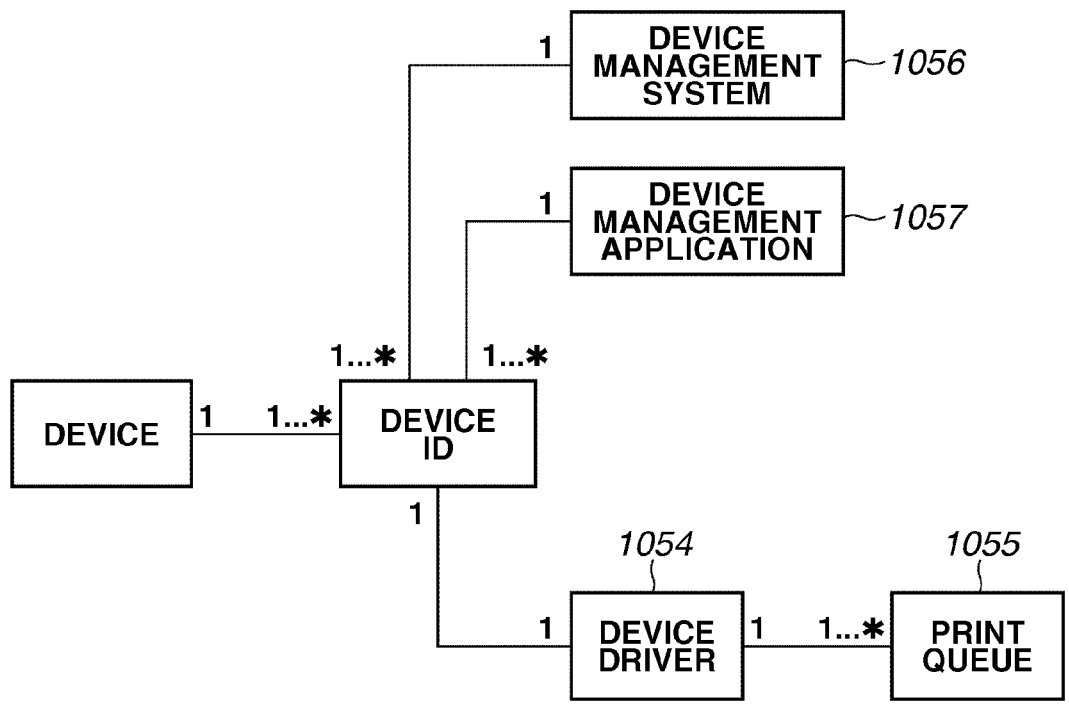
FIG. 5 is a Unified Modeling Language (UML) diagram illustrating a relationship between a device ID of a printer and a device management application, a device management system, a device driver, and a print queue.

FIG. 5 is a UML diagram illustrating a relationship between the device ID of the printer and the device management application 1057, the device management system 1056, the device driver 1054, and the print queue 1055.

The printer has a device ID. The printer can be provided with a plurality of device IDs. For example, in a MFP, for each function such as a scanner and a printer, a device ID can be provided for each function.

The device ID and the device driver 1054 are uniquely associated. In the relationship of the print queue 1055 to the device driver 1054, one device driver can be associated with the print queue.

The device ID is further associated with the device management system 1056 and the device management application 1057 respectively.

In other words, via the device ID, the device management application 1057 and the device management system 1056 are associated with the device driver 1054 and the print queue 1055.

With reference to Table A shown below, the association of the device ID with the device management application and the device management system is specifically described.

Table A shows the relationship among the device ID of the printer described in the device management control file 1058, the device management system 1056, and the device management application 1057.

TABLE A

| Device name | Device ID | Device management system | Device management application |
|---|---|---|---|
| Printer 1 | MFG:ABC; MDL; PRINTER1:CLS; PRINTER; CMD:PDL1; DES:ABC PRINTER1 | DevMg1 | App1 |
| Printer 2 | MFG:ABC; MDL; PRINTER2:CLS; PRINTER; CMD:PDL1; DES:ABC PRINTER2 | DevMg2 | App1 |

TABLE A-continued

| Device name | Device ID | Device management system | Device management application |
|---|---|---|---|
| Printer 3 | MFG:ABC; MDL; PRINTER3:CLS; PRINTER; CMD:PDL2; DES:ABC PRINTER3 | DevMg3 | App2 |

The device ID has information indicating a manufacturing company (MFG), a model (MDL), a class (CLS), a command (CMD), a description (DES), and the like. For example, the printer 1 shown in Table A has a device ID indicating the manufacturing company: ABC, the model: printer 1, the class: PRINTER, the command: PDL1 (private command of ABC company for print control), and the description: ABC printer 1. Table A shows that the device ID of the printer 1 is associated with the device management system: DevMg1, and the device management application: App1.

If the information is applied to the flowchart in FIG. 4, when the printer 1 is connected to the client computer 100, the device driver of the printer 1 is installed, and the print queue of the name corresponding to the manufacturing company and the model is generated. In conjunction with the installation of the device driver of the printer 1, the device management system: DevMg1 and the device management application: App1 are automatically installed. In other words, in conjunction with the installation of the device driver, the device management application is installed. Consequently, the user's operation for the installation of the device management application can be eliminated.

The device management system: DevMg1 and the device management application: App1 are used to manage the printer 1. Table A describes that the device management application: App1 manages the printer 2 together with the printer 1. Consequently, in a case where the printer 1 is connected to the client computer 100 first, and then, the printer 2 is connected, and the device management application: App1 associated with the printer 1 has already been installed, it is not necessary to newly install the App1.

The device management system manages print queues corresponding to different functions of one peripheral device. When all of the print queues are deleted, the OS deletes the device management system. For example, when one peripheral device having functions of a printer and a facsimile is connected to the client computer 100, one device management system manages a print queue of the printer and a print queue of the facsimile.

The device management system, however, cannot manage print queues corresponding to functions of a plurality of peripheral devices to which different IP addresses are assigned. For example, one device management system cannot manage both a print queue corresponding to a first peripheral device having a first IP address, and a print queue corresponding to a second peripheral device having a second IP address, the second IP address being different from the first IP address.

In other words, the one device management system can manage a print queue corresponding to the first (or second) peripheral device having the first (or second) IP address. Alternatively, the one device management system can manage a plurality of print queues corresponding to the first (or second) peripheral device having the first (or second) IP address.

In the present specification, a queue corresponding to a FAX driver is also referred to as a print queue.

Meanwhile, the device management application can manage print queues corresponding to functions of a plurality of peripheral devices to which different IP addresses are assigned. For example, one device management application can manage both a print queue corresponding to a first peripheral device having a first IP address, and a print queue corresponding to a second peripheral device having a second IP address, the second IP address being different from the first IP address. In other words, the device management application can manage print queues corresponding to individual functions of peripheral devices of different housings.

If the OS 1053 stores media access control (MAC) addresses of peripheral devices, the device management system cannot manage print queues corresponding to functions of the peripheral devices to which different MAC addresses are assigned. Meanwhile, the device management application can manage print queues corresponding to functions of a plurality of peripheral devices to which different MAC addresses are assigned. The IP addresses and the MAC addresses are collectively called addresses.

Hereinafter, with reference to the flowchart in FIG. 6, tile display processing performed in the device management application 1057 for displaying a tile of a peripheral device that is selected by the user to use on the home screen 300 in addition to the tile 301 is described. In the present specification, the home screen can be simply referred to as a display screen. The flowchart in FIG. 6 is executed, for example, when the tile 301 of the device management application is selected via the home screen 300 in FIG. 3A.

If the device management application 1057 is activated by the tile 301, in step S601, the device management application 1057 acquires, from the OS 1053, information of the print queue 1055 of the device driver 1054 that has been installed in the OS 1053.

In step S602, from the print queue information acquired in step S601, the device management application 1057 displays a device object of the print queue associated with the device management application 1057 on the screen 350 of the device management application 1057. FIG. 3B illustrates an example of the display of the device management application 1057 in step S602.

Specifically, the device management application 1057 specifies, based on the print queue information acquired from the OS and the device management control file 1058, the print queue associated with the device management application 1057.

For example, as the print queue, from the OS, if the information indicating that the device names are printer 1, printer 2, and printer 4 is acquired, the device management application 1057 refers to the information in Table A. Then, based on the print queue information acquired from the OS and Table A, the device management application 1057 specifies the printer 1 and the printer 2 as the printers associated with the device management application 1057. Device objects of the printer 1 and the printer 2 are displayed in step S602.

In step S603, the device management application 1057 acquires the print queue information of a device object 810 selected via the screen 350 in FIG. 3B. In step S604, the device management application 1057 determines whether a tile of the print queue corresponding to the device object selected by the user via the screen 350 in FIG. 3B has already been displayed on the home screen 300.

In the generation of the tile on the home screen 300, the device management application 1057 assigns a tile ID. The tile ID includes information about the device management application 1057 that is the source of the generation of the tile and the print queue.

Hereinafter, the tile ID is described. The device management application 1057 can assign a tile ID in the generation of a tile. In the processing, for example, the device management application 1057 generates a tile ID based on identification information (a name or an ID of an application) of the device management application 1057, information indicating how many tiles have been generated by the application, and an attribute of the tile, and generates a tile to which the tile ID is assigned. For example, in a case where the application name of the device management application 1057 is "App 1", and a tile is generated in a state the device object 810 is being selected, then, a tile ID "App 1-2-printer AAA" is generated. In such a way, the tile ID having the description of the print queue information as the attribute of the tile is assigned to the tile.

In a case where an instruction for displaying a default tile is issued, as will be described in a third exemplary embodiment below, the device management application 1057 generates a tile having a tile ID "App 1-1-default printer tile". In other words, the tile having the tile ID means that the tile is the first tile generated by the App, and generated based on the selection of a default printer tile display button 812.

The device management application 1057 acquires the tile ID relating to the device management application 1057 from the OS 1053. If the acquired tile ID includes the print queue information of the device object 810 being selected, the device management application 1057 determines that the tile of the selected device object 810 has already been displayed on the home screen 300.

If the acquired tile ID does not include the print queue information of the device object 810 being selected, the device management application 1057 determines that the tile has not been displayed on the home screen 300.

Figure 8A:
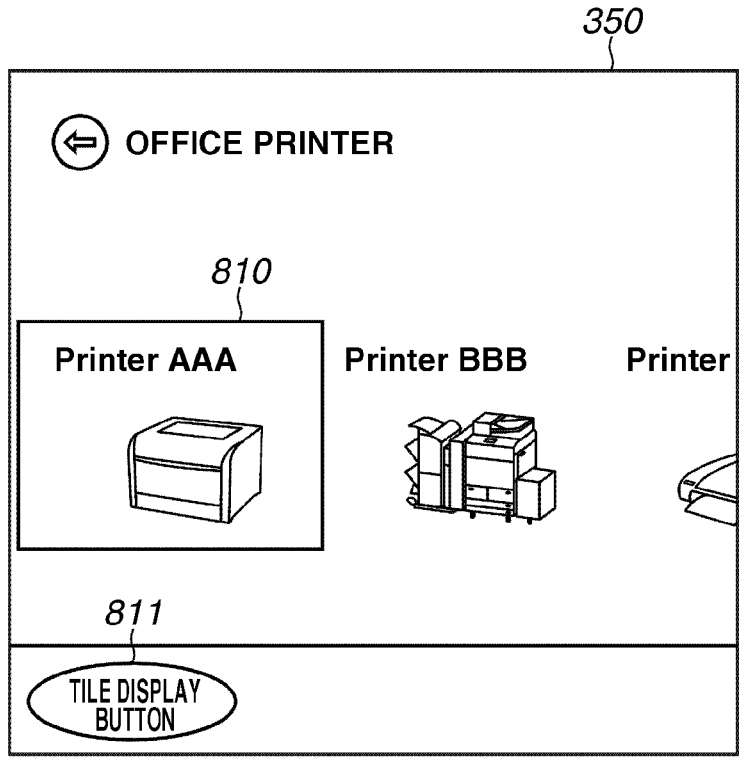
FIGS. 8A and 8B illustrate examples of a display of a tile display button and a tile non-display button.

In step S604, if the device management application 1057 determines that the tile has not displayed on the home screen 300 (NO in step S604), in step S605, the device management application 1057 displays a tile display button 811 on the screen 350 as illustrated in FIG. 8A.

Figure 8B:
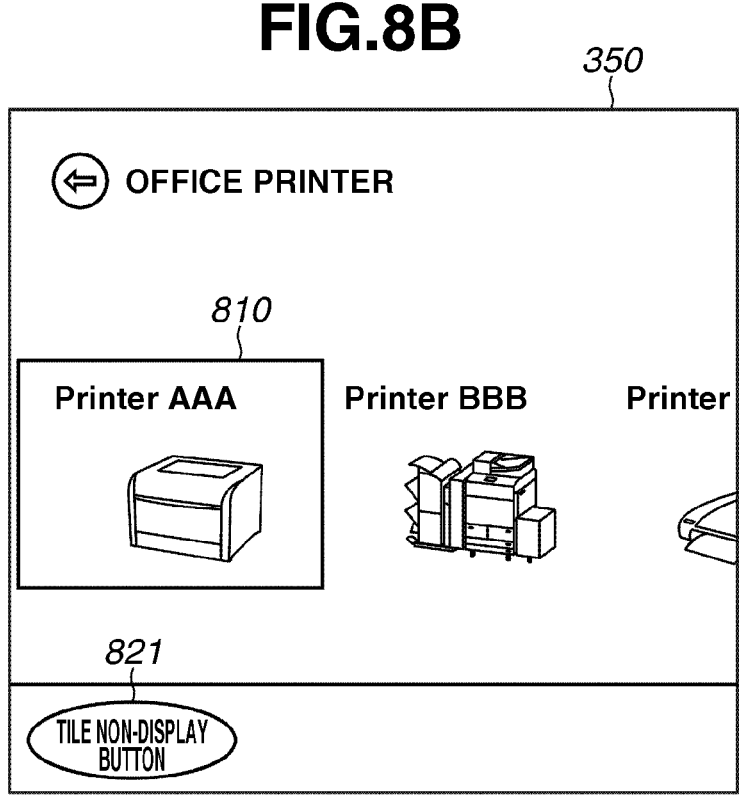

In step S604, if the device management application 1057 determines that the tile has been displayed on the home screen 300 (YES in step S604), in step S606, the device management application 1057 displays a tile non-display button 821 on the screen 350 as illustrated in FIG. 8B.

Figure 7A:
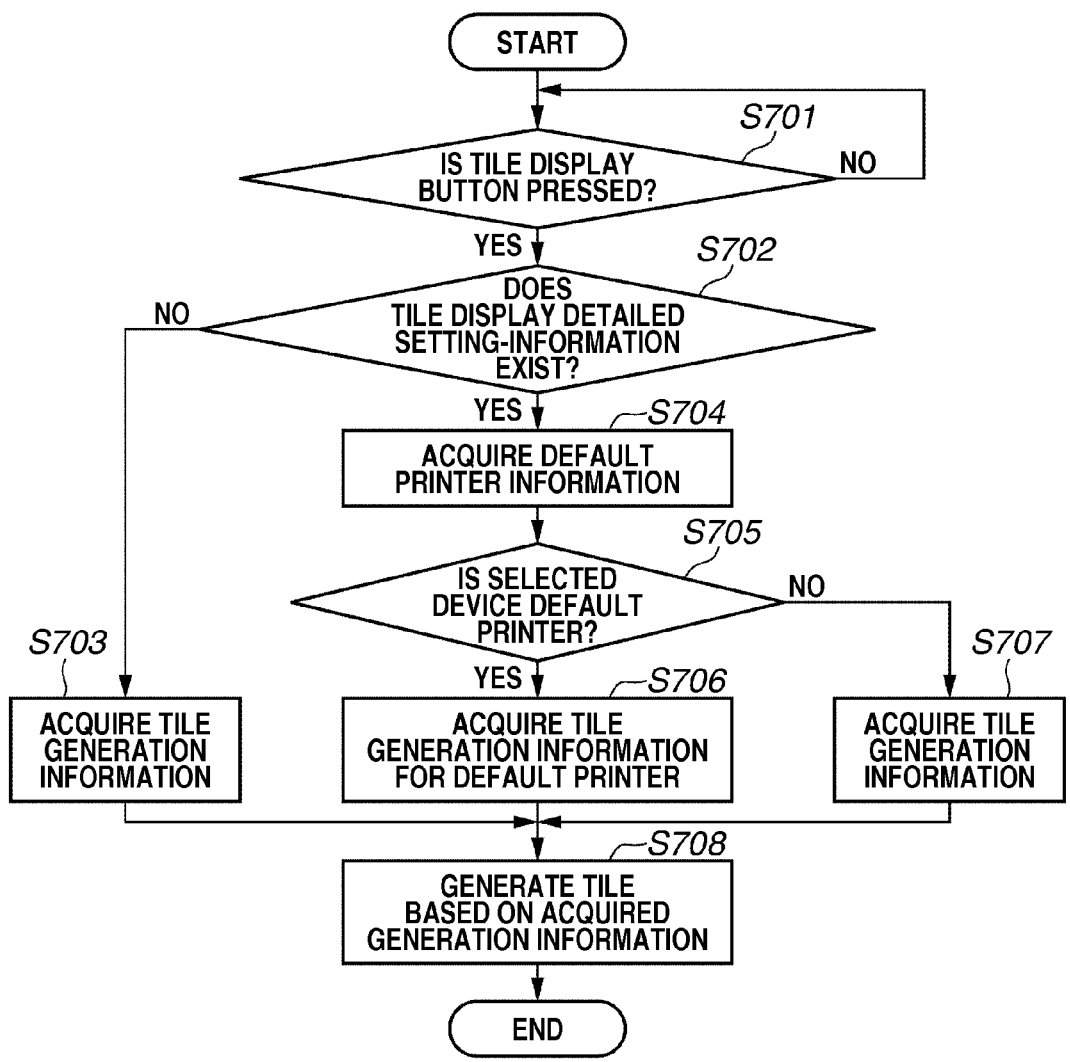
FIGS. 7A and 7B are flowcharts illustrating an operation processed in the device management application.
Figure 7B:
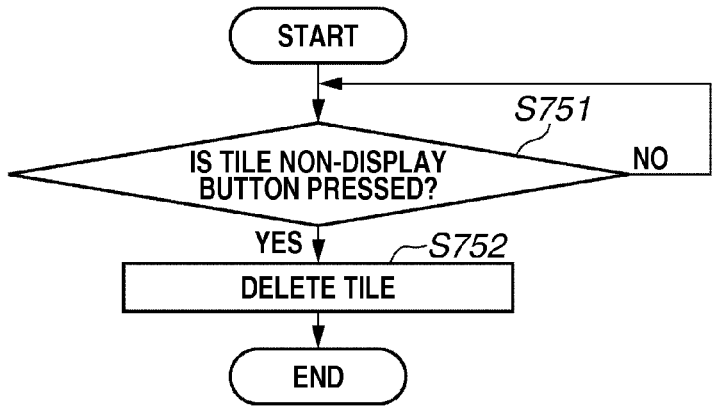

With reference to the flowcharts in FIGS. 7A and 7B, an operation processed in the device management application 1057 according to the present exemplary embodiment is described.

The flowchart in FIG. 7A illustrates an operation processed in the device management application 1057 when the tile display button 811 is pressed.

In step S701, the device management application 1057 determines whether the tile display button 811 is pressed. In step S701, if the device management application 1057 determines that the tile display button 811 is pressed (YES in step S701), in step S702, the device management application 1057 determines whether a tile display detailed setting-information exists.

With reference to FIGS. 9A and 9B, an example of the tile display detailed settings is described. FIG. 9A is one example of the information used in the tile generation, and the information includes tile generation information 901 and tile display detailed settings 910. The tile display detailed settings 910 include settings of tile generation information under a predetermined condition such as default printer tile generation information 911 and recently-used printer tile generation information 912. The settings can be pre-stored in the device management application 1057, or as illustrated in FIG. 9B, a tile display detailed setting screen 951 is displayed on the device management application screen 350, and settings can be input by the user.

In the exemplary embodiment, as an example of the setting items, a tile size and a printer picture are provided. Alternatively, any setting relating to the tile such as a color of tile can be employed. The tile generation information 901 is prestored in the device management application 1057.

Figure 10A:
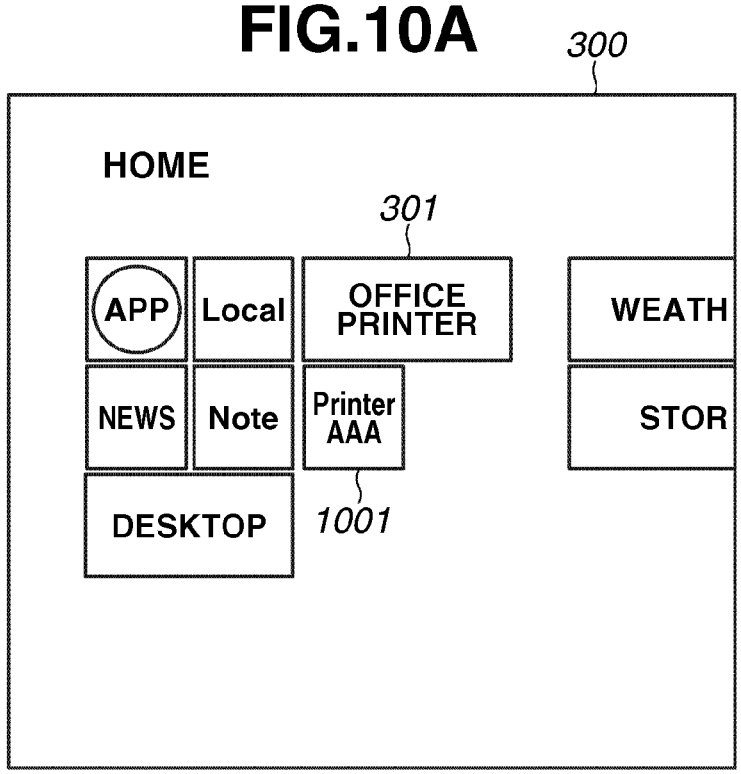
FIGS. 10A and 10B illustrate examples of a display of tiles on a home screen of the device management application.

In step S702, if the device management application 1057 determines that the tile display detailed setting-information 910 does not exist (NO in step S702), in step S703, the device management application 1057 acquires the tile generation information 901. In step S708, based on the tile generation information 901 acquired in step S703, on the home screen 300, the device management application 1057 generates a tile 1001 of the device object selected via the screen 350 (FIG. 10A).

In the present exemplary embodiment, the device management application 1057 generates the tile 1001 on the home screen 300. Alternatively, the device management application 1057 notifies the OS 1053 of the tile generation information 901 and of the information of the device object selected via the screen 350, and the OS 1053 can generate the tile 1001 on the home screen 300. That is, according to a tile generation instruction from the device management application 1057, the OS 1053 can generate a tile. The processing for displaying the tile generated in such a manner and for changing the style of the tile is referred to as display control processing.

On the other hand, in step S702, if the device management application 1057 determines that the tile display detailed setting-information 910 exists (YES in step S702), in step S704, the device management application 1057 acquires information about the default printer from the OS 1053. The default printer can be referred to as an ordinary use printer.

In step S705, the device management application 1057 determines whether the device object 810 being selected at the time the tile display button is operated is the default printer. In step S705, if the device management application 1057 determines that the device object 810 being selected is the default printer (YES in step S705), the process proceeds to step S706.

Figure 10B:
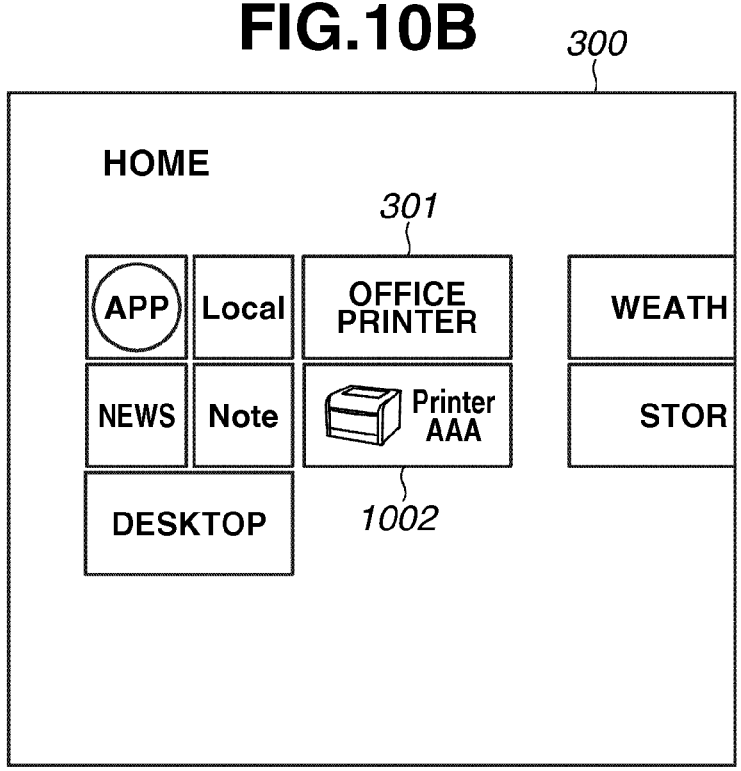

In step S706, the device management application 1057 acquires the default printer tile generation information 911. In step S708, based on the default printer tile generation information 911 acquired in step S706 and the information of the device object selected via the screen 350, the device management application 1057 generates a tile 1002 on the screen 300 (FIG. 10B).

In the present exemplary embodiment, the device management application 1057 generates the tile 1002 on the home screen 300. Alternatively, the device management application 1057 notifies the OS 1053 of the tile generation information 911 and of the information of the selected device object, and the OS 1053 can generate the tile 1002 on the home screen 300. That is, according to a tile generation instruction from the device management application 1057, the OS 1053 can generate the tile 1002.

Meanwhile, in step S705, if the device management application 1057 determines that the device object being selected is not the default printer (NO in step S705), the process proceeds to step S707. In step S707, the device management application 1057 acquires the tile generation information 901. In step S708, based on the tile generation information 901 acquired in step S707 and the information of the selected device object, the device management application 1057 generates the tile 1001 on the screen 300.

The flowchart in FIG. 7B illustrates an operation processed in the device management application 1057 when the tile non-display button 821 is pressed.

In step S751, the device management application 1057 determines whether the tile non-display button 821 is pressed. In step S751, if the device management application 1057 determines that the tile non-display button is pressed (YES in step S751), the process proceeds to step S752.

In step S752, the device management application 1057 deletes the tile (the tile 1001 or the tile 1002) of the device object 810 selected via the screen 350 of the device management application 1057.

In the present exemplary embodiment, the device management application 1057 deletes the tile on the home screen 300. Alternatively, the device management application 1057 can notify the OS 1053 of the information of the tile to be deleted, and the OS 1053 can delete the tile on the home screen 300. In other words, according to a tile deletion instruction from the device management application 1057, the OS 1053 can delete the tile.

With reference to the flowchart in FIG. 11, tile update processing in the device management application 1057 performed when the default printer managed by the OS is changed will be described. The flowchart in FIG. 11 is executed, for example, when the tile 301 of the device management application is selected via the home screen 300 in FIG. 3A. Alternatively, the flowchart can be executed when the default printer managed by the OS is changed.

Steps S1101 to S1102 in FIG. 11 are similar to steps S601 to S602 in FIG. 6, and consequently, their descriptions are omitted. Steps S1109 to S1112 in FIG. 11 are similar to steps S603 to S606 in FIG. 6, and consequently, their descriptions are omitted.

In step S1103 in FIG. 11, the device management application 1057 determines whether a tile (the tile 1001 or the tile 1002) of a print queue of a device managed by the device management application 1057 exists on the home screen 300. The device management application 1057 acquires a tile ID relating to the device management application 1057 from the OS 1053. If the device management application 1057 can acquire at least one tile ID, the device management application 1057 determines that the tile of the print queue of the device managed by the device management application 1057 exists. Meanwhile, if the device management application 1057 can acquire no tile ID, the device management application 1057 determines that the tile of the print queue of the device managed by the device management application 1057 does not exist.

In step S1103, if the device management application 1057 determines that the tile ID does not exist (NO in step S1103), the process proceeds to step S1109. Meanwhile, in step S1103, if the device management application 1057 determines that the tile ID exists (YES in step S1103), in step S1104, the device management application 1057 determines whether the tile display detailed setting-information 910 exists. In step S1104, if the device management application 1057 determines that the tile display detailed setting-information 910 does not exist (NO in step S1104), the process proceeds to step S1109.

Meanwhile, in step S1104, if the device management application 1057 determines that the tile display detailed setting-information 910 exists (YES in step S1104), in step S1105, the device management application 1057 acquires the default printer information from the OS 1053. In step S1106, the device management application 1057 acquires information of the tile (the tile 1001 or the tile 1002) of the device managed by the device management application 1057 on the home screen 300.

In step S1107, the device management application 1057 compares the default printer information acquired in step S1105 with the tile information acquired in step S1106, and determines whether the tile display of the default printer is correct. As an example of the processing in step S1107, the device management application 1057 determines whether the tile of the default printer acquired in step S1105 is included in the tile information acquired in step S1106. If the device management application 1057 determines that the tile is included, the device management application 1057 determines whether the tile of the default printer is generated based on the default printer tile generation information 911 in FIG. 9A. The determination is implemented by referring to the tile ID of the tile corresponding to the default printer.

If the device management application 1057 determines that the tile of the default printer is generated based on the default printer tile generation information in FIG. 9A, in step S1107, the device management application 1057 determines that the tile display is correct. In the cases other than the above case, the device management application 1057 determines that the tile display is not correct. For example, if the tile of the default printer acquired in step S1105 is not included in the tile information acquired in step S1106. However, the default printer acquired in step S1105 is the printer to be managed by the device management application 1057, in step S1107, the device management application 1057 determines that the tile display is not correct.

In step S1107, if the device management application 1057 determines that the tile display of the default printer is correct (YES in step S1107), the process proceeds to step S1109. Meanwhile, in step S1107, if the device management application 1057 determines that the tile display of the default printer is not correct (NO in step S1107), the process proceeds to step S1108. In step S1108, the device management application 1057 updates the tile to be managed on the home screen 300 to reflect the change of the default printer.

Specifically, in FIG. 8A, in a state where the device object 810 is being selected, the tile display button 811 is selected. In such processing, if "Printer AAA" is not originally the default printer, the device management application 1057 generates "Printer AAA" tile 1001 in FIG. 10A based on the tile generation information 901 in FIG. 9A, and displays the tile.

If the default printer managed by the OS is changed from another printer to "Printer AAA", the device management application 1057 updates the tile 1001 to the tile 1002. Specifically, the device management application 1057 generates "Printer AAA" tile 1002 like the tile in FIG. 10B based on the default printer tile generation information 911 in FIG. 9A, and displays the tile.

In the above-described example, the tile that has already been generated based on the tile generation information 901 is updated based on the default printer tile generation information 911. If the tile of the selected device object has not generated yet, and the changed default printer is the printer to be managed by the device management application 1057, the device management application 1057 generates a new tile based on the tile generation information 911, and displays the tile.

According to the above-described procedure, processing is performed according to the flowcharts in FIG. 6, FIGS. 7A and 7B, and FIG. 11, and thereby the tile (the tile 1001 or the tile 1002) of the printer that the user wants to use can be displayed on the home screen 300 separately from the tile 301 of the device management application 1057. Further, the user can easily identify the tile of the default printer from the tiles of the other printers. Consequently, for example, when the user wants to select the icon (tile) of the default printer, the user can easily find the intended icon (tile).

Moreover, in response to the change of the default printer managed by the OS, the device management application 1057 automatically updates to the tile for the default printer. As a result, the load in the operation of the user can be reduced.

In the first exemplary embodiment, the application to the default printer is described. In the exemplary embodiment, in place of the default printer, an application to a "recently-used printer" is described. The tile display processing in the device management application 1057 according to the exemplary embodiment is similar to that in the flowchart in FIG. 6, and consequently, its description is omitted.

With reference to the flowchart in FIG. 12, an operation processed in the device management application 1057 when the tile display button 811 according to the present exemplary embodiment is pressed is described. The operation processed in the device management application 1057 when the tile non-display button 821 is pressed is similar to that in the flowchart in FIG. 7B. Consequently, its description is omitted.

In the description of the second exemplary embodiment, descriptions similar to those in the first exemplary embodiment will be omitted.

Steps S1202 to S1203 in FIG. 12 are similar to steps S701 to S703 in FIG. 7A, and consequently, their descriptions are omitted.

In step S1202, if the device management application 1057 determines that the tile display detailed setting-information 910 exists (YES in step S1202), in step S1204, the device management application 1057 acquires information about a recently-used printer from the OS 1053.

In step S1205, the device management application 1057 determines whether the device object being selected at the time the tile display button 811 is pressed is a recently-used printer. In step S1205, if the device object being selected is the recently-used printer (YES in step S1205), in step S1206, the device management application 1057 acquires tile generation information 912 for the recently-used printer.

In step S1208, based on the recently-used printer tile generation information 912 acquired in step S1206, the device management application 1057 generates the tile 1002 on the screen 300 (FIG. 10B). In other words, the tile 1002 is generated based on the recently-used printer tile generation information 912.

Meanwhile, in step S1205, if the device management application 1057 determines that the device object 810 being selected is not the recently-used printer (NO in step S1205), the process proceeds to step S1207. In step S1207, the device management application 1057 acquires the tile generation information 901. In step S1208, based on the tile generation information 901 acquired in step S1207, the device management application 1057 generates the tile 1001 on the screen 300.

Figure 13:
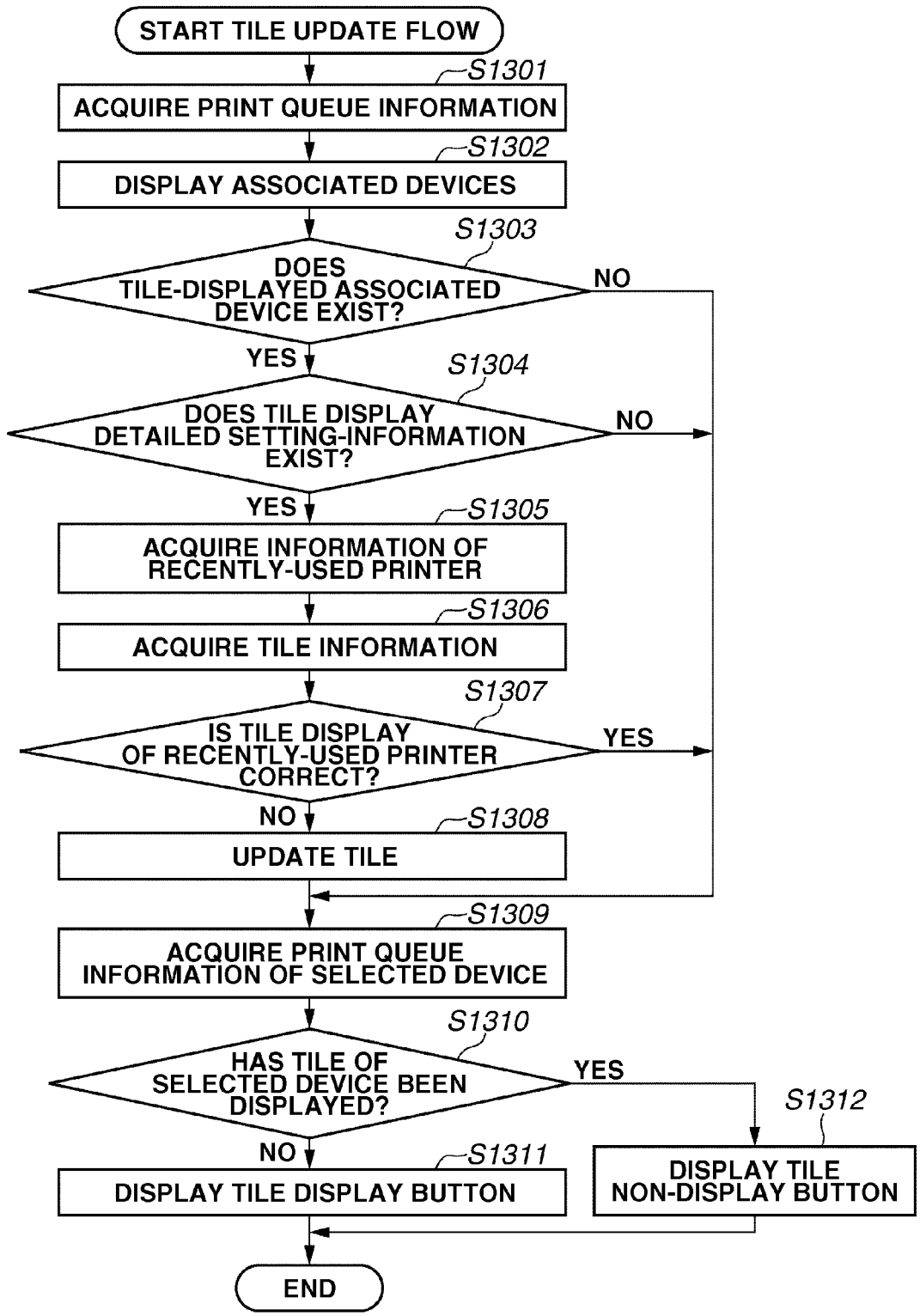
FIG. 13 is a flowchart illustrating tile update processing in the device management application with the recently-used printer.

With reference to the flowchart in FIG. 13, tile update processing in the device management application 1057 performed when the recently-used printer managed by the OS is changed in the present exemplary embodiment will be described. Steps S1301 to S1304 in FIG. 13 are similar to steps S1101 to S1104 in FIG. 11, and consequently, their descriptions are omitted. Steps S1309 to S1312 in FIG. 13 are similar to steps S1109 to S1112 in FIG. 11, and consequently, their descriptions are omitted.

In step S1304, if the device management application 1057 determines that the tile display detailed setting-information exists (YES in step S1304), the process proceeds to step S1305. In step S1305, the device management application 1057 acquires information about a recently-used printer from the OS 1053. In step S1306, the device management application 1057 acquires information of the tile (the tile 1001 or the tile 1002) of the print queue of the device managed by the device management application 1057 on the home screen 300.

In step S1307, the device management application 1057 compares the information about the recently-used printer acquired in step S1305 with the tile information acquired in step S1306, and determines whether the tile display of the recently-used printer is correct.

Specifically, the device management application 1057 determines whether the tile of the recently-used printer specified by the information acquired in step S1305 is included in the tile information acquired in step S1306. If the device management application 1057 determines that the tile is included, the device management application 1057 determines whether the tile of the recently-used printer is generated based on the recently-used printer tile generation information 912 in FIG. 9A. If the device management application 1057 determines that the tile of the recently-used printer is generated based on the recently-used printer tile generation information 912 in FIG. 9A, in step S1307, the device management application 1057 determines that the tile display is correct.

In step S1307, if the device management application 1057 determines that the tile display of the recently-used printer is correct (YES in step S1307), the process proceeds to step S1309. On the other hand, in step S1307, if the device management application 1057 determines that the tile display of the recently-used printer is not correct (NO in step S1307), the process proceeds to step S1308. In step S1308, the device management application 1057 updates the tile of the recently-used printer, and the process proceeds to step S1309.

In FIG. 13, the tile that has already been generated is updated based on the recently-used printer tile generation information 912. However, if the tile of the device object selected via the screen of the device management application 1057 has not generated, the device management application 1057 generates a new tile based on the recently-used printer tile generation information 912.

According to the above-described procedure, the processing is performed according to the flowcharts in FIG. 12 and FIG. 13, and thereby the user can display the tile (the tile 1001 or the tile 1002) of the print queue of the recently-used printer on the home screen 300 separately from the tile 301 of the device management application 1057. Further, the user can easily identify the tile of the recently-used printer from the tiles of the other printers. Furthermore, if the recently-used printer managed by the OS is changed, the device management application 1057 automatically updates the tile to the tile for the recently-used printer. As a result, the load in the operation of the user can be reduced.

In the first and second exemplary embodiments, the tile of the device object selected via the screen of the device management application can be displayed on the home screen 300. However, the default printer can be changed by a user's instruction, and consequently, if the user wants to display the tile of the print queue of the default printer on the home screen 300, it is necessary to generate a new tile each time the default printer is changed.

Specifically, for example, in the first exemplary embodiment, it is assumed that the Printer AAA is being selected as the default printer. The user selects the printer object 810 of "Printer AAA", and selects the tile display button 811, and thereby the tile 1002 of the Printer AAA is generated. If the default printer is changed to "Printer CCC", to generate a tile of the Printer CCC, the user is required to select the object of "Printer CCC" via the screen of the device management application 1057, and to select the tile display button 811.

Figure 14:
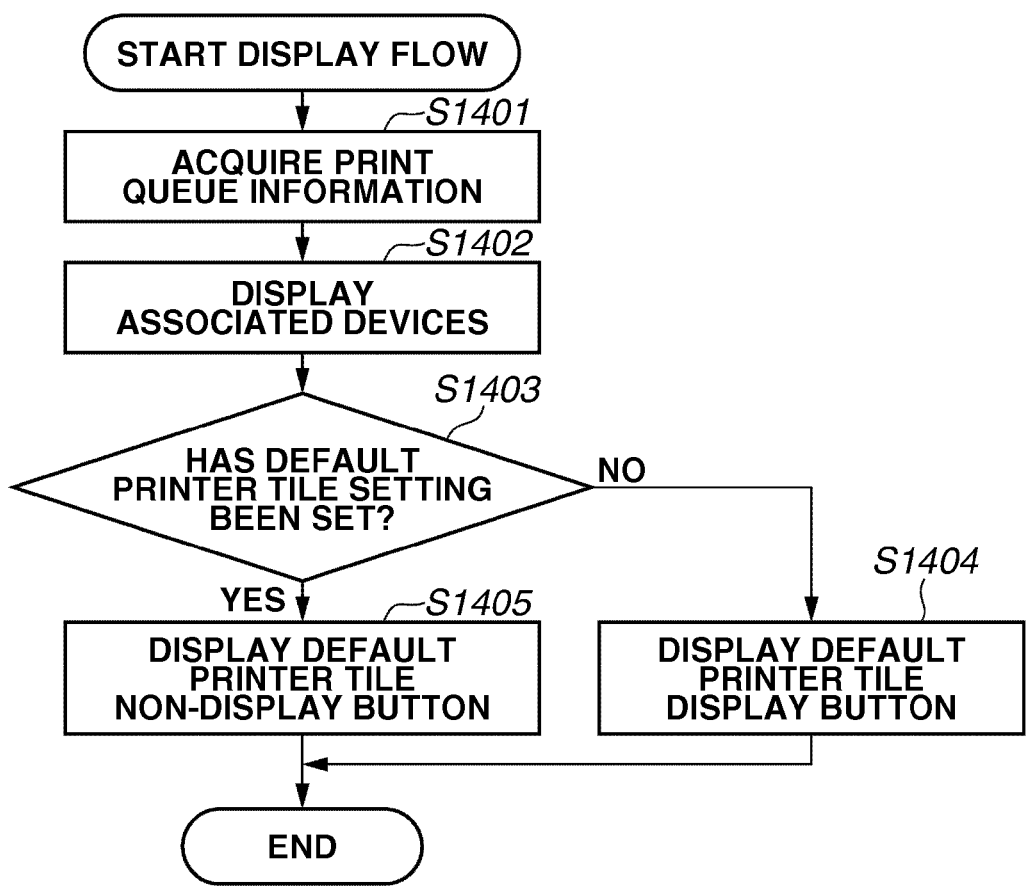
FIG. 14 is a flowchart illustrating processing for displaying a default printer tile button.

To solve the problem, in the present exemplary embodiment, when the default printer managed by the OS is changed, the display contents of the default printer tile are automatically updated to the changed default printer. With reference to FIG. 14, the tile display processing performed in the device management application 1057 according to the present exemplary embodiment is described.

In the description of the third exemplary embodiment, descriptions similar to those in the first and second exemplary embodiments will be omitted.

Steps S1401 to S1402 in FIG. 14 are similar to steps S601 to S602 in FIG. 6, and consequently, their descriptions are omitted. In step S1403, the device management application 1057 determines whether a default printer tile setting has been set.

The "default printer tile setting" is a flag relating to the default printer tile display button 812 described below in FIG. 17A. The flag is stored in the device management application 1057, and the initial value is set to off. When the default printer tile display button 812 is pressed, the device management application 1057 turns on the flag ("default printer tile setting"). Meanwhile, when a default printer tile non-display button 822 is pressed, the device management application 1057 turns off the flag ("default printer tile setting").

In step S1403, if the device management application 1057 determines that the default printer tile setting is turned off (NO in step S1403), the process proceeds to step S1404. In step S1404, the device management application 1057 displays the default printer tile display button 812 on the screen 350 of the device management application 1057. FIG. 17A illustrates an example of the default printer tile display button. Meanwhile, if the device management application 1057 determines that the default printer tile setting is turned on (YES in step S1403), the process proceeds to step S1405. In step S1405, the device management application 1057 displays the default printer tile non-display button 822 on the screen 350 of the device management application 1057. FIG. 17B illustrates an example of the default printer tile non-display button.

Figure 15A:
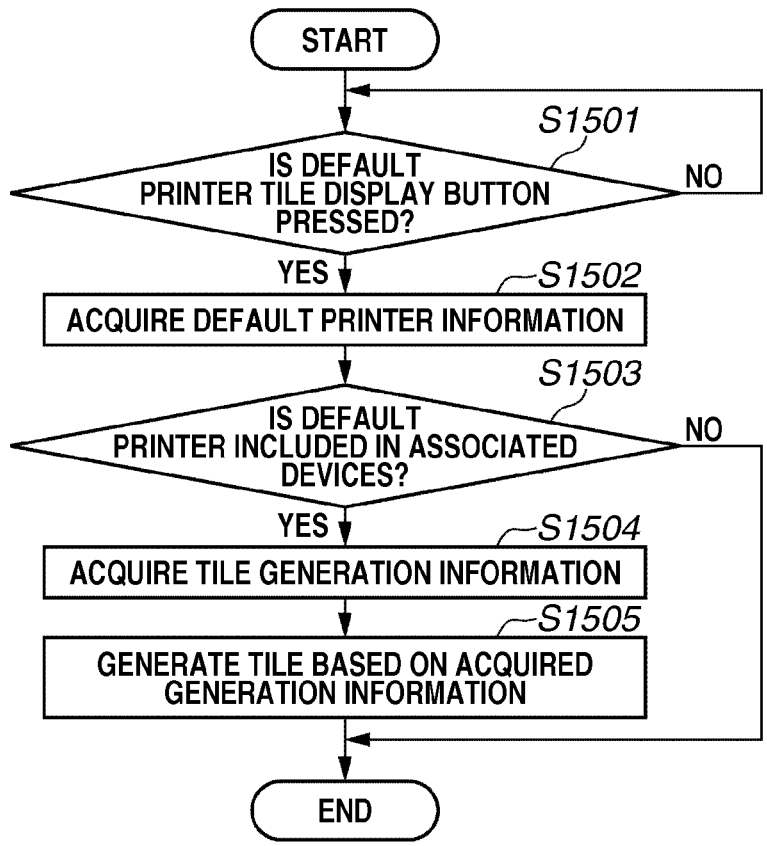
FIGS. 15A and 15B are flowcharts illustrating operations processed in the device management application for the default printer tile.
Figure 15B:
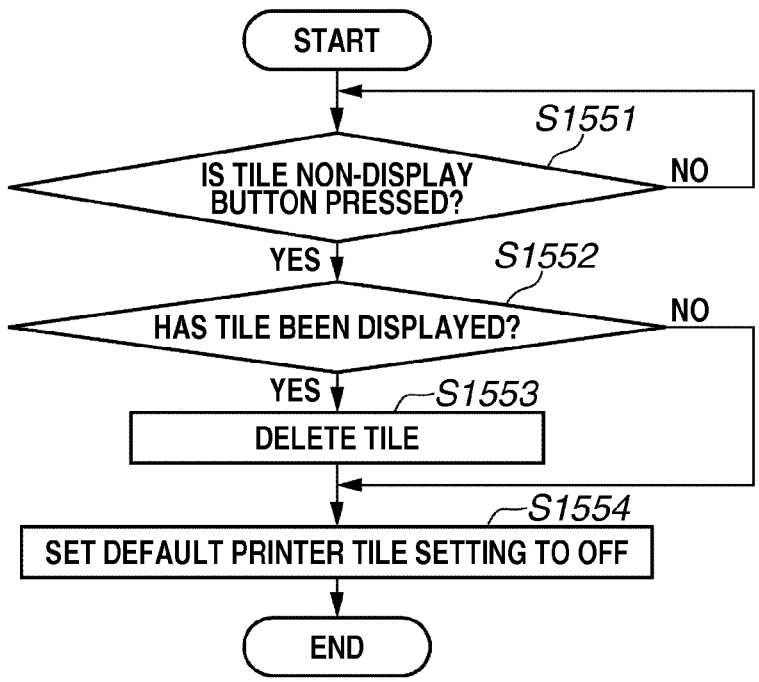

With reference to the flowcharts in FIGS. 15A and 15B, an operation processed in the device management application 1057 according to the present exemplary embodiment is respectively described.

The flowchart in FIG. 15A illustrates an operation processed in the device management application 1057 when the default printer tile display button 812 is pressed.

In step S1501, the device management application 1057 determines whether the default printer tile display button 812 is pressed. In step S1501, if the device management application 1057 determines that the default printer tile display button 812 is pressed (YES in step S1501), in step S1502, the device management application 1057 acquires information about the default printer from the OS 1053.

In step S1503, the device management application 1057 determines whether the print queue managed by the device management application 1057 includes the default printer. The processing in step S1503 is described in more detail. The device management application 1057 acquires, from the OS, information about all print queues managed by the OS. Then, the device management application 1057 compares the acquired information about all print queues with the device management control file 1058 described above, and specifies the print queue to be managed by the device management application 1057. The device management application 1057 acquires information about the default printer from the OS, and determines whether the print queue to be managed by the device management application 1057 specified in the previous processing includes the default printer. With the above-described processing, the processing in step S1503 is implemented.

In step S1503, if the device management application 1057 determines that the print queue being managed by the device management application 1057 does not include the default printer (NO in step S1503), the device management application 1057 ends the processing. In such a case, the tile generation processing is not performed, and consequently, for example, the device management application 1057 displays a message such as "Default printer tile is not generated since the default printer is not included in the printers being managed."

Meanwhile, in step S1503, if the device management application 1057 determines that the print queue being managed by the device management application 1057 includes the default printer (YES in step S1503), the process proceeds to step S1504. In step S1504, the device management application 1057 acquires the default printer tile generation information 911.

In step S1505, based on the tile generation information 911 acquired in step S1504, the device management application 1057 generates the default printer tile 1002 on the screen 300 (FIG. 10B). For example, in the state in FIG. 3A, if the flowchart in FIG. 15A is executed, and "Printer AAA" is set as the default printer, the device management application 1057 displays the tile 1002 as illustrated in FIG. 10B.

In the exemplary embodiment, after the default printer tile display button is pressed, the device management application 1057 determines whether the default printer is included in the associated devices. In the processing of displaying the screen of the device management application 1057, the device management application 1057 determines whether the default printer is included in the associated devices. If the device management application 1057 determines that the default printer is not included in the associated devices, the device management application 1057 can hide the default printer tile display button.

The flowchart in FIG. 15B illustrates an operation processed in the device management application 1057 when the default printer tile non-display button 822 is pressed. In step S1551, the device management application 1057 determines whether the default printer tile non-display button 822 is pressed. In step S1551, if the device management application 1057 determines that the default printer tile non-display button 822 is pressed (YES in step S1551), the process proceeds to step S1552.

In step S1552, the device management application 1057 determines whether the default printer tile 1002 has been displayed on the home screen 300. The processing in step S1552 is described in more detail. As described above, a tile ID is generated based on identification information (a name or an ID of an application) of the device management application 1057, information indicating how many tiles have been generated by the application, and an attribute of the tile. To the tile generated by the device management application 1057, a common application name is applied. Consequently, the device management application 1057 acquires the tile ID including its own application name from the OS. The device management application 1057 determines whether the tile ID includes the attribute "Default printer tile", and thereby the processing in step S1552 is implemented.

In step S1552, if the device management application 1057 determines that the default printer tile 1002 has been displayed (YES in step S1552), the process proceeds to step S1553. In step S1553, the device management application 1057 deletes the default printer tile 1002 on the home screen 300.

In the exemplary embodiment, the device management application 1057 deletes the tile on the home screen 300. Alternatively, the device management application 1057 can notify the OS 1053 of the information of the tile to be deleted, and the OS 1053 can delete the tile on the home screen 300.

In step S1554, the device management application 1057 turns off the default printer tile setting and ends the processing.

Meanwhile, in step S1552, if the device management application 1057 determines that the default printer tile 1002 has not been displayed (NO in step S1552), the process proceeds to step S1554.

Figure 16:
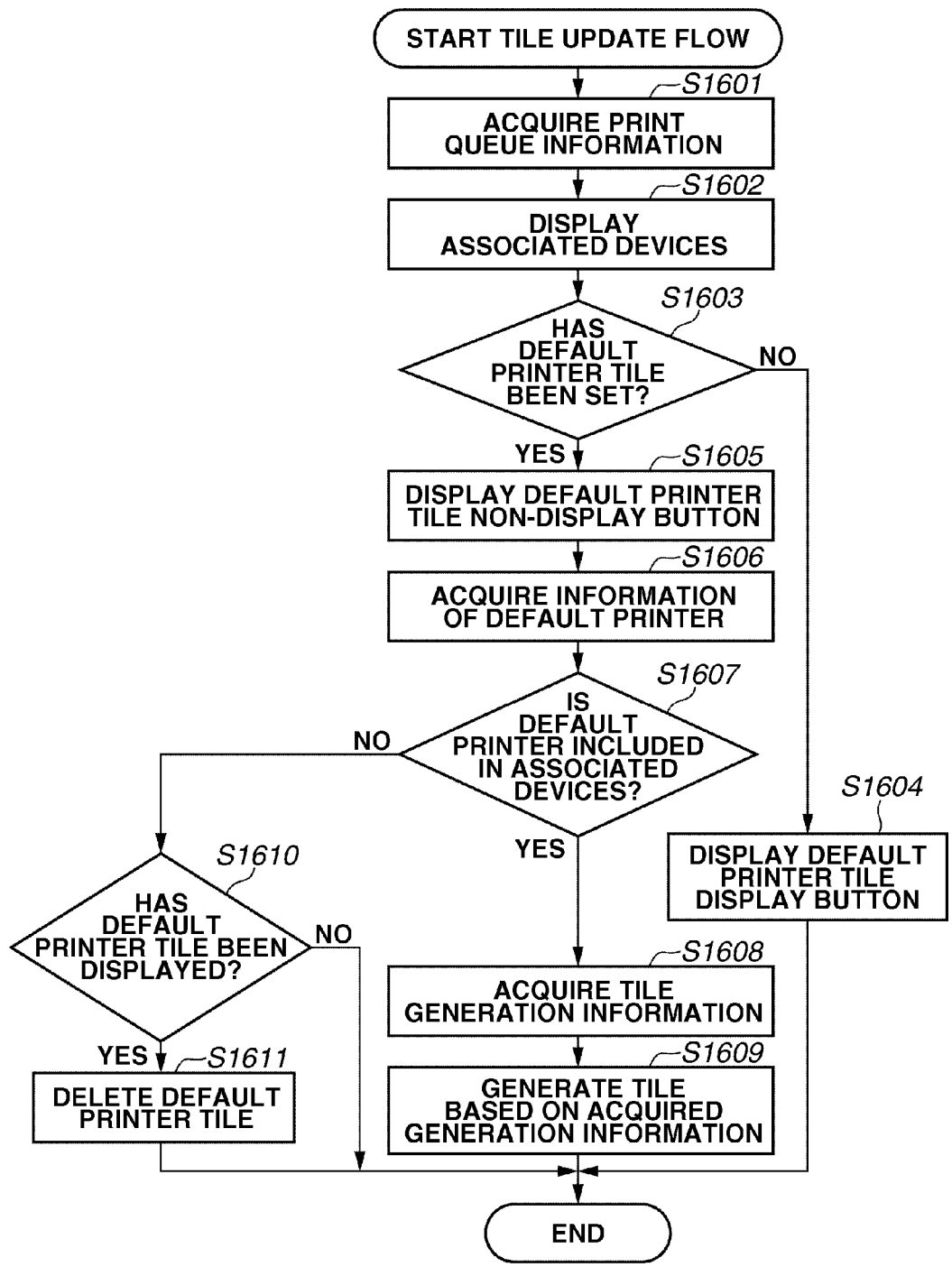
FIG. 16 is a flowchart illustrating default printer tile update processing.

With reference to the flowchart in FIG. 16, the tile update processing in the device management application 1057 performed when the default printer is changed will be described. The flowchart in FIG. 16 is executed, for example, when the tile 301 of the device management application is selected via the home screen 300 in FIG. 3A. Alternatively, the flowchart can be executed when the default printer managed by the OS is changed.

Steps S1601 to S1605 in FIG. 16 are similar to steps S1401 to S1405 in FIG. 6, and consequently, their descriptions are omitted.

In step S1606, the device management application 1057 acquires information about the default printer from the OS 1053. In step S1607, the device management application 1057 determines whether the print queue managed by the device management application 1057 includes the default printer.

In step S1607, if the device management application 1057 determines that the print queue being managed by the device management application 1057 includes the default printer (YES in step S1607), the process proceeds to step S1608. In step S1608, the device management application 1057 acquires the default printer tile generation information 911. In step S1609, based on the tile generation information 911 acquired in step S1608, the device management application 1057 generates the tile 1002 on the screen 300 (FIG. 10B).

Meanwhile, in step S1607, if the device management application 1057 determines that the print queue being managed by the device management application 1057 does not include the default printer (NO in step S1607), the process proceeds to step S1610. In step S1610, the device management application 1057 determines whether the default printer tile 1002 has already been displayed on the home screen 300.

In step S1610, if the device management application 1057 determines that the default printer tile 1002 has already been displayed on the home screen 300 (YES in step S1610), the process proceeds to step S1611. In step S1611, the device management application 1057 deletes the default printer tile 1002 on the home screen 300. In other words, if the attribute of the default printer is set to a print queue that is not managed by the device management application 1057, the device management application 1057 deletes the default printer tile 1002.

Meanwhile, in step S1610, if the device management application 1057 determines that the default printer tile 1002 has not displayed (NO in step S1610), the processing ends.

According to the above-described procedure, the processing is performed according to the flowcharts in FIGS. 14 to 16, and thereby, when the user changes the default printer managed by the OS, the display contents of the default printer tile are automatically updated for the default printer.

Figure 18:
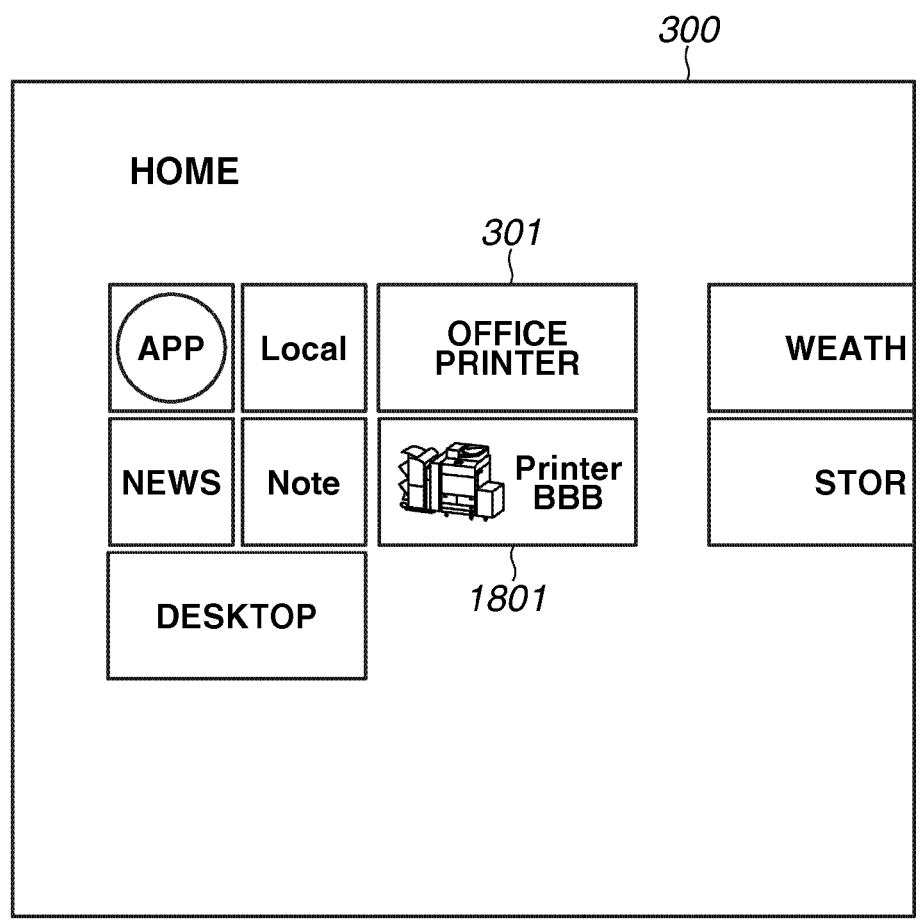
FIG. 18 illustrates an example of an updated default printer tile.

Specifically, when the default printer is set to the Printer AAA, the tile 1002 in FIG. 10B is displayed, and if the default printer is changed to the Printer BBB, the tile 1002 is automatically updated to the tile 1801 in FIG. 18. Further, if the default printer is changed from the Printer BBB to a printer that is not managed by the device management application 1057, the tile 1801 is deleted from the tile as illustrated in FIG. 18 to FIG. 3A.

Figure 17A:
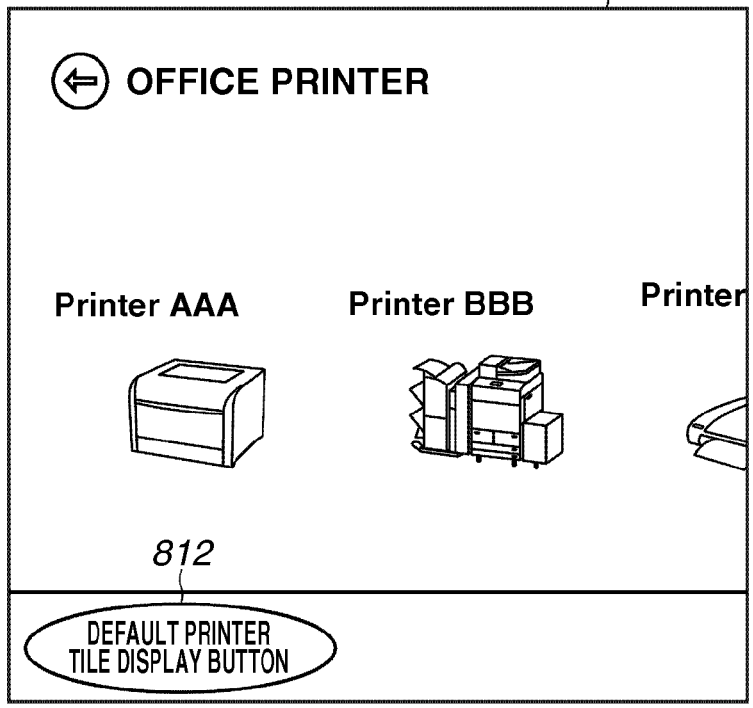
FIGS. 17A and 17B illustrate examples of a display of a default printer tile display button and a default printer tile non-display button.
Figure 17B:
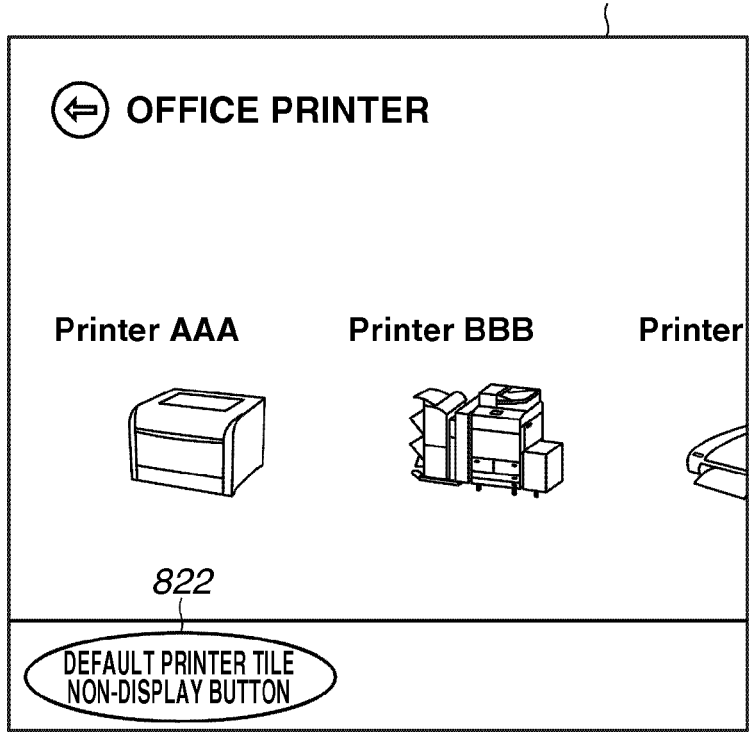
Figure 19:
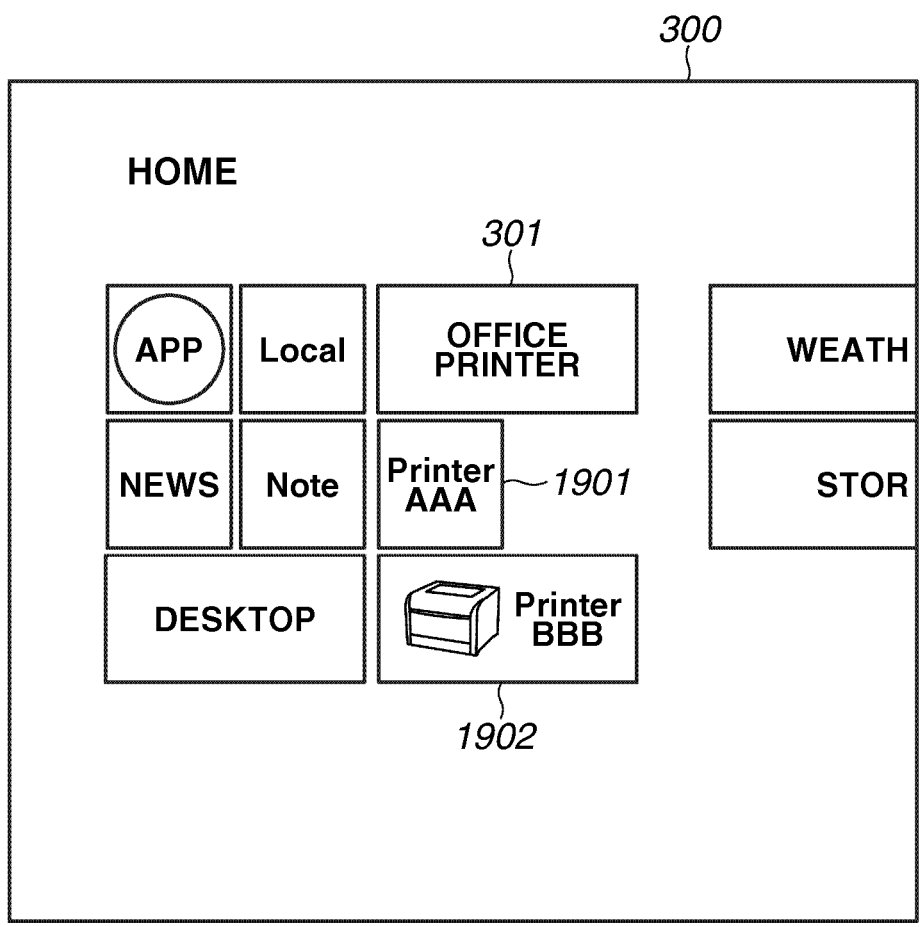
FIG. 19 illustrates an example of a home screen.

In the example in FIG. 17A, only the default printer tile display button 812 is displayed on the screen 350 of the device management application 1057. However, both the above-described tile display button and the default printer tile display button can be displayed on the screen 350 of the device management application 1057. In such a case, for example, if the default printer is set to the Printer AAA, the device object 810 is selected, and the tile display button is selected, the tile 1002 illustrated in FIG. 10B is displayed. Further, if the default printer is changed to the Printer BBB, and the default printer tile display button is selected, the tile 1002 in FIG. 10B is changed to the tile 1901 in FIG. 19. Further, the tile 1902 in FIG. 19 is newly displayed as the default printer tile. The description is similarly applied to a case of a most recently-used printer described below.

In FIG. 19, if the default printer is set to the print queue of the Printer AAA, a plurality of the same tiles are displayed. In such a case, one of the tiles is to be displayed. For example, the device management application 1057 updates the tile 1901 based on the tile generation information 911, and deletes the default printer tile 1902 as well. After such processing, if the default printer is changed to another printer managed by the device management application 1057, the device management application 1057 can restore the default printer tile 1902, and display the tile.

In the present exemplary embodiment, the application to the default printer is described. In place of the default printer, a most recently-used printer can be used. In such a case, in FIG. 17A, a printer tile display button for the most recently-used printer is displayed. If the most recently-used printer tile display button is selected, the device management application 1057 determines whether the print queue being managed by the device management application 1057 includes the most recently-used printer acquired from the OS.

If the device management application 1057 determines that the printer is included, based on the name of the most recently-used printer and the tile generation information 912 in FIG. 9A, the device management application 1057 displays the most-recently used printer tile, for example, as the tile 1002 in FIG. 10B. If the most recently-used printer managed by the OS is changed, for example, from the Printer AAA to the Printer BBB, the most recently-used printer tile 1002 is automatically changed to the tile 1801 in FIG. 18

In other words, the tile generated in the first and second exemplary embodiments is the tile dedicated to a specific device. However, the tile generated in the third exemplary embodiment is the tile commonly used among a plurality of devices.

Figure 20:
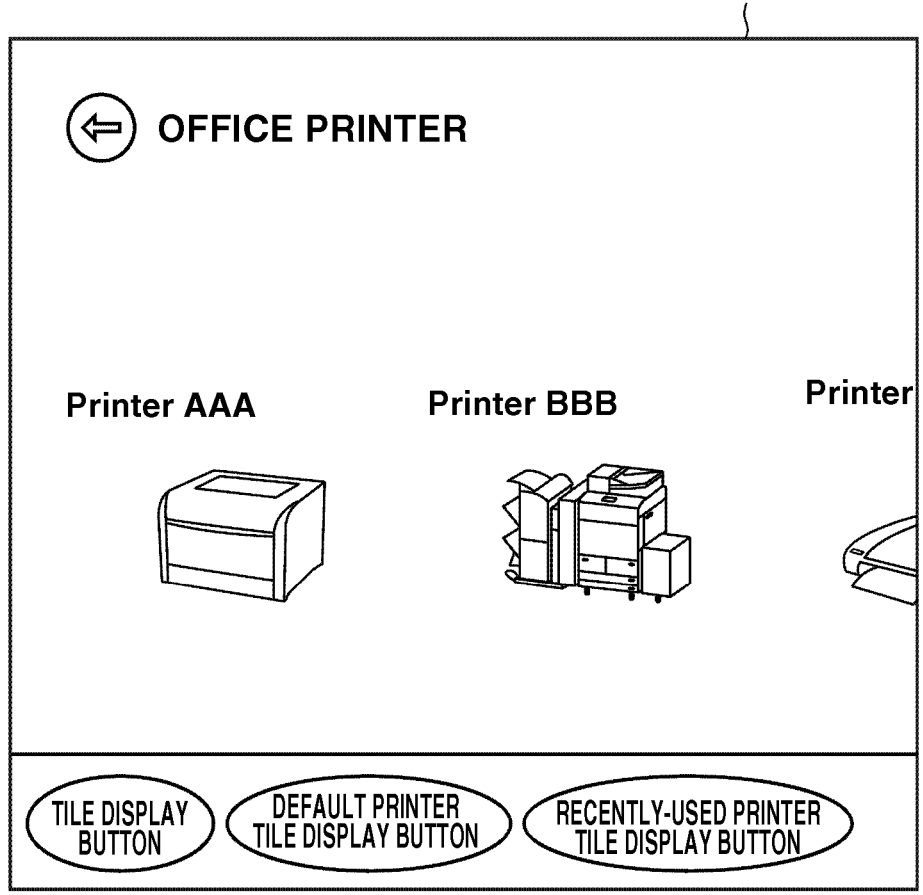
FIG. 20 illustrate an example of tile display buttons.

According to the present exemplary embodiment, the user can easily identify the default printer and the most recently-used printer. As illustrated in FIG. 20, together with the tile display button and the default printer tile display button, the most recently-used printer tile display button can be displayed. Alternatively, in the three buttons, at least one button can be displayed.

An aspect of the present invention can be implemented by executing the following processing. That is, software (program) to implement the functions of the above-described exemplary embodiments is supplied to a system or apparatus via a network or various storage medium. A computer (or CPU or micro processing unit (MPU)) of the system or apparatus reads out and executes the program.

According to the exemplary embodiments of the present invention, the operability of the user can be increased.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-094818 filed Apr. 18, 2012, which is hereby incorporated by reference herein in its entirety.

What is claimed is:

1. An information processing apparatus comprising:
a display unit configured to display a list screen including device objects for a plurality of peripheral apparatuses associated with a management application to be installed in an installed operating system;
the display unit being further configured to display the list screen after the management application is activated in response to selection of an activating object of the management application on a home screen on which other activating objects are displayed;
the display unit being further configured to display an instruction object for instructing to display an activating object corresponding to one of the device objects of the plurality of peripheral apparatuses on the list screen selected by a user instruction; and
a receiving unit configured to receive an instruction generated by operation of the instruction object, wherein
if the receiving unit receives the instruction, the activating object corresponding to the selected device object is displayed on the home screen.

2. The information processing apparatus according to claim 1, wherein an image and a name regarding a peripheral apparatus corresponding to the device object is displayed in the activating object corresponding to the device object.

3. The information processing apparatus according to claim 1, wherein the activating object corresponding to the device object is displayed with the activating object of the management application.

4. The information processing apparatus according to claim 1, wherein
   the receiving unit receives the instruction generated by operation of the instruction object to display the activating object corresponding to a default printer on the home screen;
   the activating object corresponding to the default printer is displayed on the home screen if the receiving unit receives the instruction generated by operation of the instruction object to display the activating object corresponding to the default printer, and
   in a case where the default printer is updated and changed, an activating object corresponding to the changed default printer is displayed on the home screen.

5. The information processing apparatus according to claim 1, wherein
   the receiving unit receives the instruction not to display the activating object corresponding to the device object on the home screen, and
   the activating object corresponding to the device object is not displayed on the home screen if the receiving unit receives the instruction not to display the activating object corresponding to the device object on the home screen.

6. An information processing method comprising:
   installing a management application in an installed operating system;
   displaying a list screen including device objects for a plurality of peripheral apparatuses associated with the management application after the management application is activated in response to selection of an activating object of the management application on a home screen on which other activating objects are displayed;
   displaying an instruction object for instructing to display an activating object corresponding to one of the device objects of the plurality of peripheral apparatuses on the listed screen selected by a user instruction; and
   receiving an instruction to generated by operation of the instruction object, wherein
   if the instruction is received, the activating object corresponding to the device object is displayed on the home screen, and
   the management application is activated if the activating object corresponding to the device object is selected on the home screen.

7. The information processing method according to claim 6, wherein an image and a name regarding a peripheral apparatus corresponding to the device object is displayed in the activating object corresponding to the device object.

8. The information processing method according to claim 6, wherein the activating object corresponding to the device object is displayed with the activating object of the management application.

9. The information processing method according to claim 6, wherein
   the instruction instructs to display the activating object corresponding to a default printer on the home screen;
   the activating object corresponding to the default printer is displayed on the home screen if the received instruction instructs to display the activating object corresponding to the default printer, and
   in a case where the default printer is updated and changed, an activating object corresponding to the changed default printer is displayed on the home screen.

10. The information processing method according to claim 6, wherein
    the instruction instructs not to display the activating object corresponding to the device object on the home screen, and
    the activating object corresponding to the device object is not displayed on the home screen if the instruction instructs not to display the activating object corresponding to the device object on the home screen.

11. A non-transitory computer readable medium storing a program for causing a computer to function as each unit included in the information processing apparatus according to claim 6.

* * * * *